United States Patent
Barnum et al.

(10) Patent No.: US 11,106,104 B2
(45) Date of Patent: Aug. 31, 2021

(54) DISTRIBUTED ENERGY MANAGEMENT SYSTEM

(71) Applicant: Kinestral Technologies, Inc., Hayward, CA (US)

(72) Inventors: Walter Thomas Barnum, Salt Lake City, UT (US); Luis Fernando Gomez, Salt Lake City, UT (US); Douglas Frederick Brainard, Farmington, UT (US)

(73) Assignee: Kinestral Technologies, Inc., Hayward, CA (US)

( * ) Notice: Subject to any disclaimer, the term of this patent is extended or adjusted under 35 U.S.C. 154(b) by 0 days.

(21) Appl. No.: 16/775,070

(22) Filed: Jan. 28, 2020

(65) Prior Publication Data
US 2020/0241375 A1    Jul. 30, 2020

Related U.S. Application Data

(60) Provisional application No. 62/798,103, filed on Jan. 29, 2019.

(51) Int. Cl.
*G02F 1/1523* (2019.01)
*H02J 9/00* (2006.01)

(52) U.S. Cl.
CPC ............ *G02F 1/1525* (2013.01); *H02J 9/002* (2013.01)

(58) Field of Classification Search
CPC ............................... G02F 1/1525; H02J 9/002
See application file for complete search history.

(56) References Cited

U.S. PATENT DOCUMENTS

| | | |
|---|---|---|
| 6,795,226 B2 | 9/2004 | Agrawal et al. |
| 8,886,261 B2 | 11/2014 | Aerrabotu |
| 2014/0111006 A1* | 4/2014 | Baldassarre ............ H02J 9/002 307/23 |
| 2014/0148925 A1* | 5/2014 | Ahn ........................ H02J 3/14 700/19 |
| 2018/0059498 A1 | 3/2018 | Coffin et al. |

(Continued)

FOREIGN PATENT DOCUMENTS

| | | |
|---|---|---|
| CA | 2633620 A1 | 1/2002 |
| CN | 109066856 A | 12/2018 |
| WO | 2017007841 A1 | 1/2017 |

OTHER PUBLICATIONS

International Search Report dated Apr. 14, 2020, on application No. PCT/US2020/015715.

(Continued)

*Primary Examiner* — Daniel Kessie
(74) *Attorney, Agent, or Firm* — Lowenstein Sandler LLP

(57) ABSTRACT

A distributed energy management system (EMS) for supplying power to a set of drivers that charge and discharge a set of electrochromic devices is described. One distributed EMS includes an external power supply interface to couple to an external power supply, a multi-device boost power supply comprising a set of batteries, and a driver interface to supply power to a set of drivers that charge and discharge a set of electrochromic devices. The distributed EMS also includes a communication subsystem to communicate with the set of drivers and EMS circuitry to supply power to the set of drivers, via the driver interface, based on a power state of the multi-device boost power supply and a state of the set of electrochromic devices.

23 Claims, 11 Drawing Sheets

(56) References Cited

U.S. PATENT DOCUMENTS

2018/0187478 A1 7/2018 Vigano et al.
2018/0323624 A1* 11/2018 Chang .................... G06F 1/263

OTHER PUBLICATIONS

Mukaitani, I., Miyamoto, A.K.Y. and Kamijo, K.H.T., Next Generation Wireless Battery Monitoring System (Gen. 2). No. 60/Mar. 2018, p. 14.

* cited by examiner

DISTRIBUTED ENERGY MANAGEMENT SYSTEM

RELATED APPLICATIONS

This application claims the benefit of U.S. Provisional No. 62/798,103, filed Jan. 29, 2019, the entire contents of which are incorporated by reference.

BACKGROUND

An electrochromic glass unit uses electrochromic glass that can change transmissivity with the application of electric current and voltage. The change of transmissivity typically relies on a reversible oxidation of a material. Electrochromic glass units can darken at the press of a button or other triggering events and are also often used in automobile rearview mirrors to reduce reflective glare. Controllers or drivers for electrochromic devices generally apply voltage and current of one polarity to charge the device and decrease optical transmissivity and the opposite polarity to discharge the device and increase the optical transmissivity.

The transmissivity change for current systems is relatively slow and non-uniform. Gradual, non-uniform coloring or switching is a common problem associated with large area electrochromic devices. This problem, commonly referred to as the "iris effect," is typically the result of the voltage drop through the transparent conductive coatings providing electrical contact to one side or both sides of the device. For example, when a voltage is initially applied to the device, the potential is typically the greatest in the vicinity of the edge of the device (where the voltage is applied) and the least at the center of the device; as a result, there may be a significant difference between the transmissivity near the edge of the device and the transmissivity at the center of the device. Over time, however, the difference in applied voltage between the center and edge decreases and, as a result, the difference in transmissivity at the center and edge of the device decreases.

One method of improving the switching speed of a large electrochromic device is to supply more power to the electrochromic device. However, there are several challenges that the supplying of large amounts of power introduces. The electrochromic device can be damaged by large amounts of power. The non-uniformity of the transmission of the electrochromic device during switching (e.g., the iris effect) can be exacerbated. Cables and power supplies required to supply a large amount of electrical power also need to be large, which introduces added cost to the system.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

DETAILED DESCRIPTION

Figure 1:
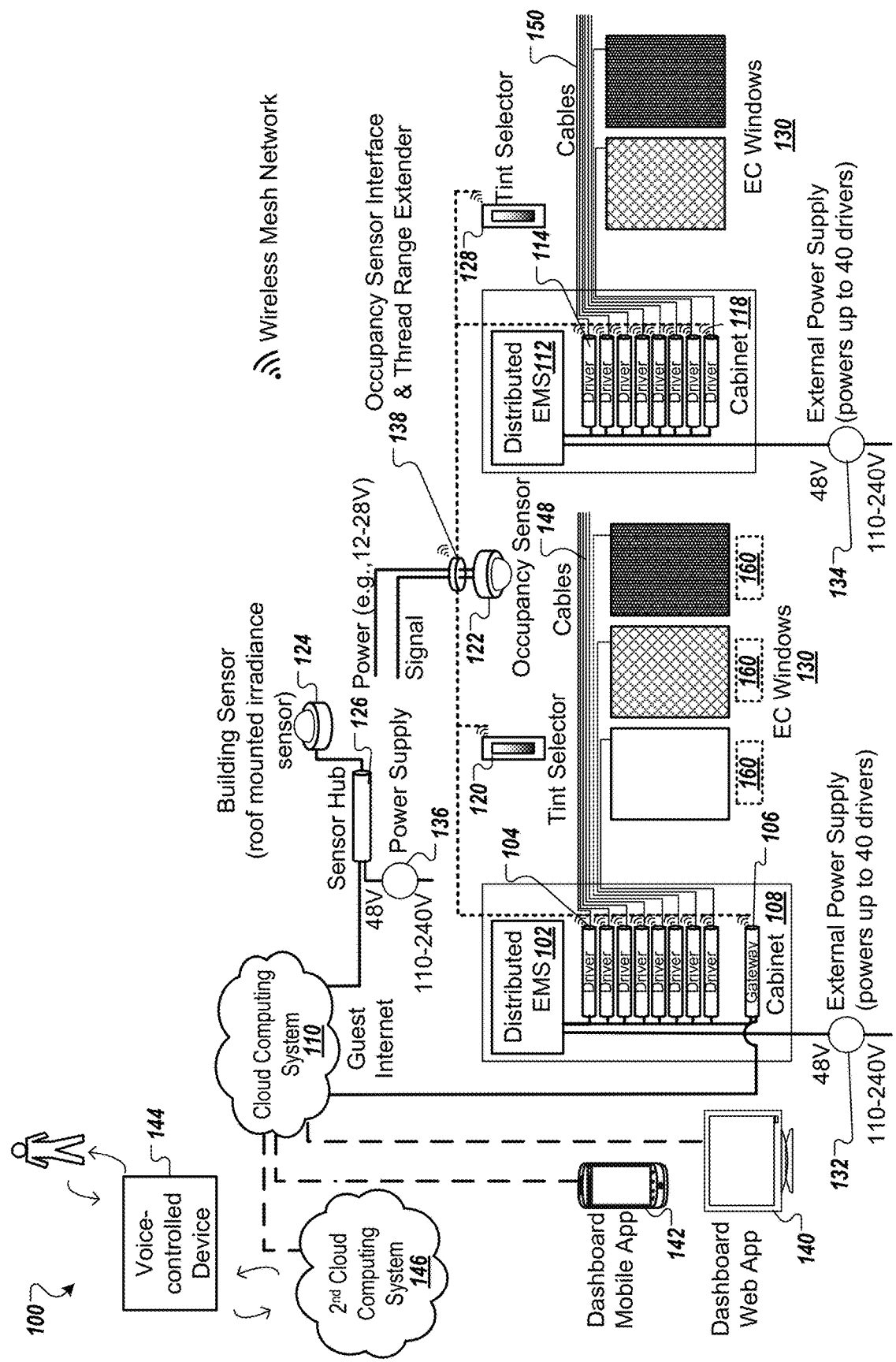
FIG. 1 is a block diagram of an electrochromic window system 100 with a distributed energy management system (EMS) to dynamically provide power to electrochromic windows according to one embodiment.

A distributed energy management system (EMS) for supplying power to a set of drivers that charge and discharge a set of electrochromic devices is described. One distributed EMS includes an external power supply interface to couple to an external power supply, a multi-device boost power supply comprising a set of batteries, and a driver interface to supply power to a set of drivers that charge and discharge a set of electrochromic devices and a gateway operatively coupled to a cloud computing system. The distributed EMS also includes a radio to wirelessly communicate with the set of drivers and the gateway and EMS circuitry to supply power to the set of drivers, via the driver interface, based on a power state of the multi-device boost power supply and a state of the set of electrochromic devices.

Some conventional systems use a local power source (e.g., a battery) inside of a driver to supply additional power (also referred to as boost power) to an electrochromic device than can be supplied by a main power supply. The additional power can enable fast and uniform switching in a variety of conditions, and in particular when the electrochromic device includes a gradient conductive layer. An electrochromic device including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an electrochromic device incorporating such a layer at much higher voltages so that high amounts of power are required initially to drive fast switching. The size of the electrochromic device governs how much power is needed to switch the state of the electrochromic device. The power needed can be referred to as peak watt power. An electrochromic device of a first size may need a peak watt power of 28 watts and a conventional driver could supply 14 volts and 2 amps to the electrochromic device to meet the peak watt power. However, an electrochromic device of a second size (e.g., 5'×10' EC window) may need a peak watt power of 320 watts. The conventional driver could not supply sufficient volts and amps to meet the peak watt power. Adding extra batteries to the conventional driver can be limiting because of the size of the batteries.

Aspects of the present disclosure address the above and other deficiencies by providing a distributed EMS that includes a multi-device boost power supply that can supply sufficient power to a set of drivers that charge and discharge a set of electrochromic devices. The distributed EMS can be used to provide sufficient power to meet higher peak watt power demands of larger electrochromic devices. The distributed EMS can centralize the boost power supply to supply power to multiple drivers and can permit the multiple drivers to time-share the boost power supply. A system can be designed for a worst-case scenario by selecting a number of external power supplies and one or more distributed EMSes in terms of a total power demand should all drivers need power to transition its respective electrochromic device's state. The number of drivers, number of gateways, and size and number of the electrochromic devices factor into the selection of the number of external power supplies and the number of distributed EMSes needed in a system.

The distributed EMS can operate in connection with intelligence in a cloud computing system to balance energy needed and speed of transition of a set of electrochromic devices individually or collectively. For example, the distributed EMS can communicate data to the cloud computing system via a radio using a gateway operatively coupled to the cloud computing system. The cloud computing system can determine how the set of electrochromic devices should operate individually and collectively. The cloud computing system can provide a schedule (e.g., in a schedule file) and configuration information (e.g., in a configuration file) for each of the drivers to the gateway and the gateway can provide the respective configuration information to the corresponding driver. The schedule can be used by the gateway to control gateway operations and a timing of the gateway operations even in the absence of the connection with the cloud computing system. The configuration information can be used by the driver to control driver operations and timing of the driver operations even in the absence of the connection with the gateway and/or the cloud computing system. The cloud computing system can define the configuration information to specify how the respective driver should drive the electrochromic device according to multiple power states of the distributed EMS. That is, the distributed EMS can broadcast an indicator of its power state to the drivers and the gateway. The driver, using the indicator of the power state, can determine how to charge and discharge its respective electrochromic device. It should be noted that, after the drivers and the distributed EMS are configured via the gateway, the EMS and driver behavior is not dependent on the gateway for safe operation. That is, the gateway can be disconnected and the drivers will not drain the batteries of the distributed EMS.

Accordingly, aspects of the present disclosure can provide various advantages over the conventional systems. For example, the aspects of the present disclosure can provide sufficient boost power supply to charge and discharge larger electrochromic device, such as larger EC windows. Also, by centralizing the boost power supply, the individual drivers can be smaller in form, as they do not include a local boost power supply. The set of drivers can also time share the boost power supply in an intelligent manner, making more efficient use of the boost power supply over multiple devices. Aspects of the present disclosure can provide other advantages over the conventional systems.

FIG. 1 is a block diagram of an electrochromic window system 100 with a distributed energy management system (EMS) to dynamically provide power to electrochromic windows according to one embodiment. The electrochromic window system 100 includes a first cabinet 108 in which a first distributed EMS 102, a first set of drivers 104, and a gateway 106 are located. Each of the set of drivers 104 is coupled to an individual one of a set of electrochromic (EC) windows 130. Alternatively, other electrochromic devices can be driven by the set of drivers 104. The set of drivers 104 are coupled to the set of EC windows 130 via power cables 148 and control wires. The cabinet 108 can be a standard size, such as 28", 42", or 60". The cabinet 108 can be located in proximity to the EC windows 130 or located away from the EC windows 130, such as up to 300 feet. The cabinet 108 can be located in a location that reduces wiring costs. Between each driver and EC window there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 103, the set of drivers 104, and the gateway 106 within the first cabinet 108. For example, 16 AWG 2 conductor plenum cables can provide lower voltage (48V) or higher voltage (110-240V) to the first cabinet 108. The external power supply 132 can be located in proximity to the first cabinet 108 or farther away from the first cabinet 108, such as up to hundreds of feet or up to 1000 feet. It should be noted that the external power supply 132 is configured to supply less than 25% of a maximum power used by the set of EC windows 130 during switching of one or more of the set of EC windows 130. Additional external power supplies can be used to power the components in the first cabinet 108. The external power supply 132 may be a conventional power supply connected to the power grid or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

The gateway 106 is operatively coupled to a cloud computing system 110. The gateway 106 can be hardwired (e.g., via Ethernet) to a network device of a guest Internet, such as a network device in a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using secure communications, such as using IPV4 or IPv6 networking protocols. The cloud computing system 110 can provide control logic, glare control, and configuration for the electrochromic window system 100. The gateway 106 bridges networks, but does not act as a system controller. The cloud computing system 110 can provide automation algorithms, data analytics, user management, security protocols, and the like. The cloud computing system 110 can provide extensive system health monitoring, proactive troubleshooting, as well as provide third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The cloud computing system 110 can also interact with other devices or networks, such as illustrated in FIG. 1 with a second cloud computing system 146 that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and using encryption and authentication for secure communications. The cloud computing system 110 can include a microservice architecture that is exposed through application programming interfaces (APIs) to manage interaction with onsite components, such as the gateways, drivers, and tint selectors. The cloud computing system 110 can eliminate complicated onsite networking requirements, as the external control occurs through the APIs. The cloud computing system 110 can provide centralized data aggregation from all deployments to facilitate automation and analytics. The cloud computing system 110 can leverage existing authentication and authorization technologies to secure site access. The cloud computing system provides a robust platform that facilitates on-demand load scaling and health monitoring. The cloud computing system 110 can also provide a better path for onsite workload migration, backed by a robust central cloud store.

As described above, the gateway 106 communicates directly with the cloud computing system 110 through secured channel(s). The gateway 106 communicates with the cloud computing system 110 on behalf of the set of drivers 104 and the distributed EMS 102. The gateway 106, the set of drivers 104, and the distributed EMS 102 communicate with each over wireless connections, such as over a secure thread wireless network. For example, each of these components can communicate using IEEE 802.15.4, 2.4 GHz, IPv6 mesh network routing (thread). These communications can be encrypted with 128-bit AES encryption. Alternatively, other mesh networks can be used, as well as other frequencies, and encryption techniques.

As illustrated in FIG. 1, the electrochromic window system 100 may include additional devices, such as a tint selector 120, an occupancy sensor 122, an occupancy sensor interface and thread range extender 138, a building sensor 124 (e.g., roof mounted irradiance sensor), a sensor hub 126. The sensor hub 126 can be powered by an external power supply 136 and can be hardwired to the guest Internet, much like the gateway 106. The occupancy sensor interface and thread range extender 138 and occupancy sensor 122 can be powered by an external power supply and can send or receive signals to or from a lighting system or a building management system (BMS). The tint selector 120 and occupancy sensor interface and thread range extender 138 can communicate with other devices on the wireless mesh network. The tint selector 120 can be a device that is mounted on a wall where a user can activate a transition of the EC window 130. The tint selector 120 can be mounted or otherwise disposed in a building having the EC windows 130 to permit user control of the set of EC windows. The tint selector 120 can be programmed to be part of group of EC windows. That is the tint selector 120 can be associated with the set of drivers 104 and the gateway 106. Alternatively, the tint selector 120 can be associated with a scene of one or more EC windows, or the like. The electrochromic window system 100 can have one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene as the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway and the gateway 106 manages the second set of drivers 114 as well. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located in proximity to the second cabinet 118 or farther away from the second cabinet 118, such as up to 350 feet. In other cases, more than two cabinets may be used. It should also be noted that additional external power supplies can be used to power the components in the first cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or less components than as illustrated in FIG. 1.

In another embodiment, the electrochromic window system 100 includes drivers 160 located at each of the set of EC windows 130, instead of or in addition to the set of drivers 104 in the first cabinet 108. In some cases, each EC window 130 has a driver 160, as illustrated. In other cases, a single driver 160 can drive multiple EC windows 130. The drivers 160 can be coupled to an external power supply. The external power supply can be located at the EC window 130 or in close proximity. In this case, the external power supplies for the set of EC windows 130 can be considered to be distributed, instead of centralized as described above. In other cases, the drivers 160 do not use an external power supply.

It should be noted that various embodiments described herein are described with respect to a commercial installation. In other embodiments, the electrochromic window system 100 can be deployed in a residential installation. In those cases, there may be modifications to the electrochromic window system 100 as described above to accommodate differences between the commercial installation and the residential installation.

Figure 2:
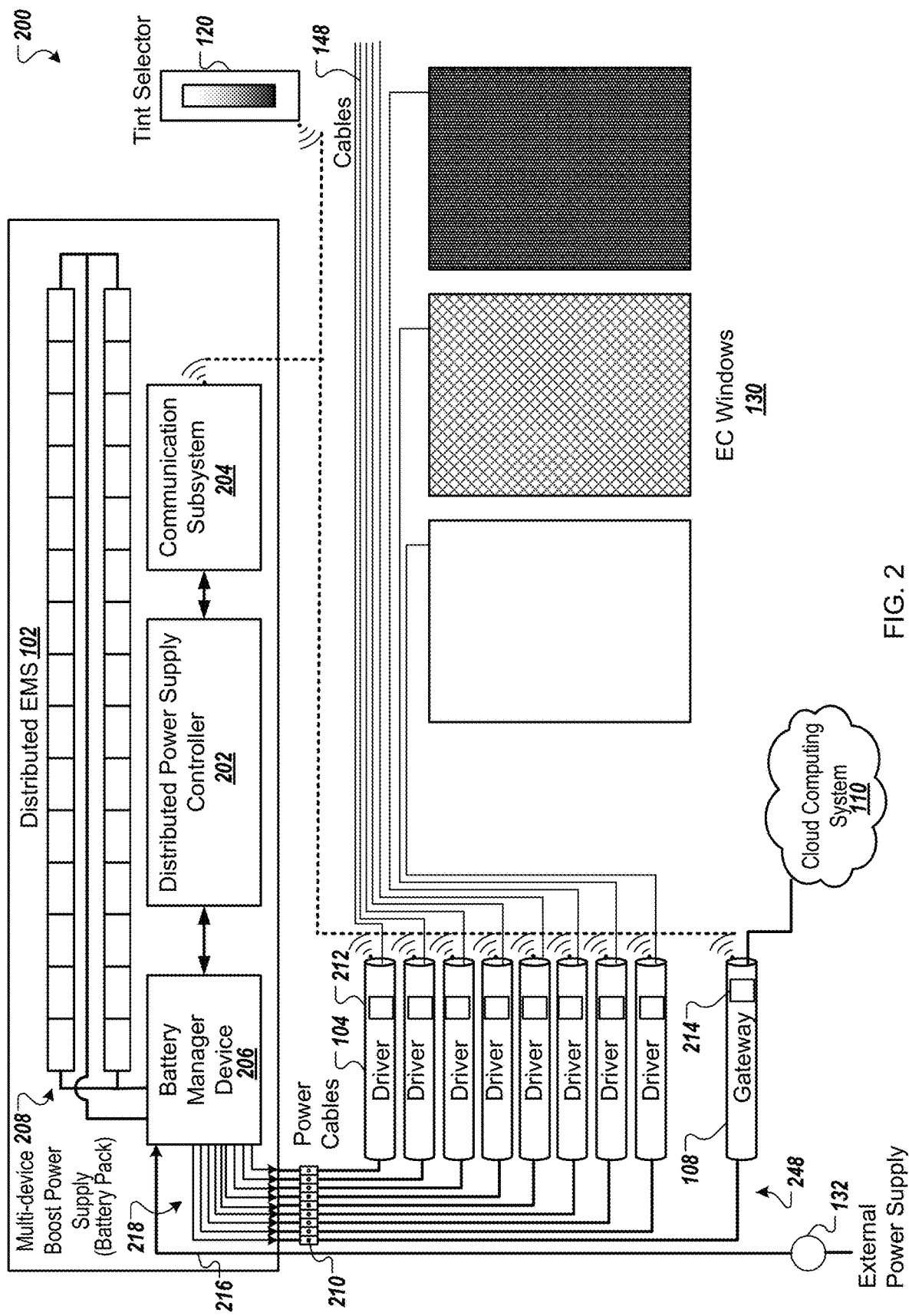
FIG. 2 is a block diagram of a distributed EMS according to one embodiment.

FIG. 2 is a block diagram of a distributed EMS according to one embodiment. The distributed EMS of FIG. 2 corresponds to the distributed EMS 102 of FIG. 1. Alternatively, the distributed EMS can correspond to the distributed EMS 112 of FIG. 1. The distributed EMS 102 includes a multi-device boost power supply 208, a distributed power supply controller 202, a communication subsystem 204, and a battery manager device 206. The communication subsystem 304 can include one or more wireless interfaces, one or more wired interfaces, or any combination thereof. The communication subsystem 304 can include one or more radios, one or more wired transceiver (e.g., Universal Asynchronous Receiver/Transmitter (UART), power line communication (PLC) transceiver, or the like. The communication subsystem 204 can wirelessly communicate with the set of drivers 104 and the gateway 106. The communication subsystem 204 can also wirelessly communicate with the tint selector 120 as described herein. Alternatively, the communication subsystem 304 can communicate with the set of drivers 104, the gateway 106, the tint selector 120, or any combination thereof, over one or more wired connections or even over power lines.

The multi-device boost power supply 208 can include various power supply sources, such as a set of batteries. The set of batteries may be organized as a battery pack of multiple battery cells. The set of batteries can be lithium iron phosphate batteries. Alternatively, the batteries can be other types of batteries or energy storage types as described herein. As illustrated in FIG. 2, the set of batteries can include a first set of battery cells coupled in series and a second set of battery cells coupled in series. The first set of battery cells is coupled in parallel to the second set of battery cells. The multi-device boost power supply 208 can connect several cells in series to achieve a desired operating voltage and can use the parallel connections between the sets of cells to attain higher capacity by adding up the total ampere-hour (Ah). In one embodiment, the distributed EMS 102 can supply 50V and 100 A. In one embodiment, the multi-device boost power supply 208 can have a total capacity of approximately 243 Wh, or 5 Ah or 18 kC with a peak power capacity of approximately 3120 W (e.g., 48.75V*64 A=3120 W (peak)). Alternatively, the total capacity can vary and include more or less total capacity and/or peak power capacity. The multi-device boost power supply 208 can support a varied number of windows based on geometry and size of the windows, how often the windows are tinted, as well as how low the batteries of the distributed EMS 102 can be discharged.

In some implementations, the multi-device boost power supply 208 of the distributed EMS is located more than 1 meter away from at least one of the set of EC windows 130. In other embodiments, the multi-device boost power supply 208 is located in close proximity to at least one of the EC windows 130.

The battery manager device 206 is coupled to an external power supply interface 216 that is coupled to the external power supply 132. The battery manager device 206 is coupled to a driver interface 218 that is coupled to the set of drivers 104 and the gateway 106 via power cables 248. The driver interface 218 can be coupled to a T-block to manage the power cables 248 within the first cabinet 108. The set of drivers 104 and the gateway 106 are coupled to the EC windows 130 via power cables 148. The battery manager device 206 is also coupled to the distributed power supply controller 202. The battery manager device 206 manages the multi-device boost power supply 208, such as to control of charging and discharging of the multi-device boost power supply 208. For example, the battery manager device 206 includes technology to charge and discharge a set of batteries. The battery manager device 206 can balance usage of battery cells, protect the battery cells, and the like. The battery manager device 206 can be a standalone integrated circuit, such as a System on Chip (SoC). Alternatively, the functionality of the battery manager device 206 can be integrated with the functionality of the distributed power supply controller 202 described below. In other embodiments, other power manager devices can be used when the multi-device boost power supply 208 contains energy storage that is not necessarily batteries.

The distributed power supply controller 202 is coupled between the battery manager device 206 and the communication subsystem 204. The distributed power supply controller 202 can be a standalone integrated circuit, such as a System on Chip (SoC). In some cases, the communication subsystem 204 can be integrated in the same integrated circuit as the distributed power supply controller 202. For example, the distributed power supply controller 202 can be a thread processor and the communication subsystem 204 can handle wireless communications for the distributed power supply controller 202 over the secure thread wireless network (e.g., mesh network using IEEE 802.15.4, 2.4 GHz, IPv6 mesh network routing). In another embodiment, the communication subsystem 204 can be a standalone integrated circuit that is separate from the distributed power supply controller 202. Alternatively, the functionality of the distributed power supply controller 202, battery manager device 206, and communication subsystem 204 can be integrated in a single integrated circuit, such as EMS circuitry described herein.

In one embodiment, the distributed power supply controller 202 can determine a charge capacity of the multi-device boost power supply 208. This can be done in connection with the battery manager device 206. For example, the battery manager device 206 can track the charge capacity and report an indication of the charge capacity to the distributed power supply controller 202. In one embodiment, before or after determining the charge capacity, the distributed power supply controller 202 can send configuration data to the set of drivers. The configuration data can specify a first total amount of power available to the set of drivers 104 in a first power state and a second total amount of power that is available in a second power state. The distributed power supply controller 202 can determine a power state of the multi-device boost power supply 208 using at least the charge capacity. In addition to the current charge capacity, the distributed power supply controller 202 can use other historical data, signals received from the tint selector 120, or other data to determine the power state. Once the power state is determined, the distributed power supply controller 202 can send an indicator of the power state to the set of drivers 104 via the communication subsystem 204. The indicator is also referred to herein as state indicator, power state indicator, or simply power state. Alternatively, the distributed power supply controller 202 can send the indicator of the power state to the gateway 106 via the communication subsystem 204. Sending an indicator of the power state to the set of drivers via the radio can communicate the power state to the set of drivers 104, as well as the gateway 106. For example, the distributed power supply controller 202 can generate a message via the communication subsystem 204, such as a message communicated through the mesh network. Once a device receives the message it can forward the message to other devices in the mesh network. In this manner, other devices can be notified quickly of the power state and any changes to the power state quickly. The power state information provided to the gateway 106 can also be shared with the cloud computing system 110. Prior to sending the indicator, the set of drivers 104 can receive configuration data (e.g., a configuration file) from the EMS circuitry or from other sources. The configuration data can specify a total amount of power available for each of the power states. For example, the configuration data can specify a first total power that is available in a first power state and a second total amount of power that is available in a second power state. The configuration data can specify additional amounts of power for other power states that can be detected. The configuration data can also specify additional information that can control the behavior of the set of drivers 104 in the various power states.

The distributed EMS 102 can supply power to the set of drivers 104 according to a state of the set of EC window 130, as well as the power state of the multi-device boost power supply 208. For example, the distributed EMS 102 can supply a first amount of power to the set of drivers 104 from the external power supply interface 216 in an idle state of the set of EC windows 130. Alternatively, the distributed EMS 102 does not supply power to the set of EC windows 130 in the idle state. The state of the EC windows 130 can also correspond to states of the distributed EMS 102, the respective driver, or both. For example, when one of the set of EC windows 130 is in an idle state, the respective driver can be considered to be in an idle state. The distributed EMS 102 can supply a second amount of power to the set of drivers from the external power supply interface 216 and from the multi-device boost power supply 208 in a switching state of at least one of the set of EC windows 130 while the multi-device boost power supply 208 is in a first power state and supply a third amount of power to the set of drivers 104 from the external power supply interface 216 and from the multi-device boost power supply 208 in the switching state of at least one of the set of EC windows 130 while the multi-device boost power supply 208 is in a second power state that is a lower power state than the first power state. Supplying the second amount of power over time charges the respective EC window 130 at a first charging rate and supplying the third amount of power over time charges the respective EC window 130 at a second charging rate that is lower than the first charging rate.

In one embodiment, the distributed power supply controller 202 sends a first control signal to the battery manager device 206 to disconnect the multi-device boost power supply 208 from the driver interface 218 in the idle state. The distributed power supply controller 202 sends a second control signal to the battery manager device 206 to connect the multi-device boost power supply 208 to the driver interface 218 in the switching state while in the first power state. The distributed power supply controller 202 sends a third control signal to the battery manager device 206 to connect the multi-device boost power supply 208 to the driver interface 218 in the switching state while in the second power state. Alternatively, additional control signals can be sent between the battery manager device 206 and the distributed power supply controller 202 to control power supplied to the set of drivers 104.

In one embodiment, the distributed power supply controller 202 can detect a power loss event on the external power supply interface 216. For example, the battery manager device 206 can detect and report the power loss event to the distributed power supply controller 202 and the distributed power supply controller 202 can send a power loss indicator to the gateway 106 and the set of drivers 104. In another embodiment, the distributed EMS 102 can detect a power loss event and broadcast a power loss state to the set of drivers 104 and the gateway 106.

In another embodiment, the distributed power supply controller 202 can determine that the charge capacity of the multi-device boost power supply 208 is a first amount of charge. The distributed power supply controller 202 determines whether the first amount satisfies a threshold criterion. For example, the threshold criterion can specify that the charge capacity is above a certain percentage, or above a certain charge capacity amount or threshold. Responsive to the first amount satisfying the threshold criterion, the distributed power supply controller 202 determines that the multi-device boost power supply 208 is in the first power state (e.g., a normal power state). Responsive to the first amount not satisfying the threshold criterion, the distributed power supply controller 202 determines that the multi-device boost power supply 208 is in the second power state (e.g., a low power state). Also, the convention of the threshold criterion can be reversed where, responsive to satisfying the threshold criterion, the distributed power supply controller 202 determines that the multi-device boost power supply is in the second power state (e.g., the low power state). Also, responsive to the first amount not satisfying the threshold criterion, the distributed power supply controller 202 determines that the multi-device boost power supply 208 is in the first power state (e.g., the normal power state). In other implementations, the distributed power supply controller 202 can use multiple threshold criterion and multiple power states. For example, the distributed power supply controller 202 can determine that the charge capacity of the multi-device boost power supply is a first amount and can determine whether the first amount is in a first range corresponding to the first power state, in a second range corresponding to the second power state, and even in a third range corresponding to a third power state and so forth.

In a further embodiment, the distributed power supply controller 202 can use additional information to determine the power state. For example, the distributed power supply controller 202 can receive a switch control signal from the tint selector 120 via the communication subsystem 204 while in the second power state. The distributed power supply controller 202 can switch the power state of the multi-device boost power supply 208 from the second power state to the first power state. Alternatively, the distributed power supply controller 202 can switch the power state from the second power state to a third power state.

As described herein, the distributed power supply controller 202 can wirelessly communicate via the communication subsystem 204 with the set of drivers 104 and the gateway 106 via a mesh network protocol. The distributed power supply controller 202 can send the indicator of the power state by broadcasting a message via the mesh network protocol. The message can include a bitmask that identifies a group that includes the set of drivers 104 and the gateway 106. The group may also include the second set of drivers 114 of FIG. 114. In other implementations, the bitmask can identify a scene, a sub-group, or the like. The bitmask is used to permit devices on the mesh network to recognize messages directed to them so the device can act accordingly.

In some embodiments, the distributed power supply controller 202 can store historical usage data regarding the multi-device boost power supply 208. The historical usage data can be tracked and stored by the battery manager device 206 and retrieved by the distributed power supply controller 202. Alternatively, the battery manager device 206 can collect the usage data and report it to the distributed power supply controller 202 and the distributed power supply controller 202 can store the usage data. The distributed power supply controller 202 can send the historical usage data to the gateway 106 via the radio and the gateway 106 can send the historical usage data to the cloud computing system 110 for monitoring and analytics.

In a further embodiment as illustrated in FIG. 2, the distributed power supply controller 202 can wirelessly communicate with an individual power supply control module 212 of each driver in the set of drivers 104. The individual power supply control module 212 can include local logic with power state consideration. That is, the local logic can operate with consideration of the power state of the distributed EMS 102. For example, a first driver includes a first individual power supply control module. A second driver includes a second individual power supply control module and so forth for each of the drivers in the set of drivers 104. The individual power supply control module 212 can operate according to a configuration file stored at the respective driver. The individual power supply control module 212 can receive the indicator of the power state from the distributed EMS 103, such as being broadcast by the communication subsystem 204. Responsive to the indicator of the power state, the individual power supply control module 212 can switch between operating parameters specified in the configuration file. For example, the configuration file can specify operating parameters of the respective driver when in the normal power state and can specify different operating parameters when in a low power state. The operating parameters may include a charge rate, a discharge rate, a maximum power permitted, a maximum current permitted, an amount to be used for Vsense, or the like. The operating parameters may also specify sequestration operations. As described herein, the configuration files can be generated by the cloud computing system 110 and provided to the respective drivers via the gateway 106.

In a further embodiment as illustrated in FIG. 2, the distributed power supply controller 202 can wirelessly communicate with a control module 214 of the gateway 106. The control module 214 can store a schedule that manages gateway operations and timing of the gateway operations. The schedule can be used to manage when particular drivers are to operate in a certain way at a certain time. The control module 214 can also receive the indicator of the power state from the distributed power supply controller 202 and respond accordingly. In some cases, the control module 214 can receive a power loss indicator from the distributed EMS 102 to indicate a power loss event on the external power supply 132. Responsive to receiving the power loss indicator, the gateway 106 can perform a set of one or more operations, such as transition the EC windows to a known, safe state, notifying the cloud computing system 110, or the like.

It should be noted that the embodiments described with respect to FIGS. 1-2 are directed to EC windows. The EC windows can have a switching time of less than five minutes from a maximum optical transmissivity state to a minimum optical transmissivity state. In some cases, such as in the lower power state, the switching time can be more than five minutes. Also, for some designs the speed of switching is relaxed and the switching time is more than five minutes in some cases. An electrochromic device including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an electrochromic device incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide though. In other embodiments, the distributed EMS 102 can be used in connection with drivers that drive other types of electrochromic devices. Additionally, the distributed EMS can be used to drive multi-panel electrochromic windows that include more than one electrochromic device connected in series or parallel. A multi-panel electrochromic window may be one where the electrochromic devices are stacked over one another to provide very low transmissivity of light through the devices, for example less than 1% transmissivity of light or less than 0.1% transmissivity of light. Alternatively the multi-panel electrochromic windows may be "tiled" adjacent to one another such that more than one electrochromic device is laminated to a carrier glass substrate to form larger sized windows. In another embodiment a single driver may be used to drive multiple electrochromic windows that may be in a group of electrochromic windows. For example a single driver may drive 2 or more electrochromic windows.

Figure 3:
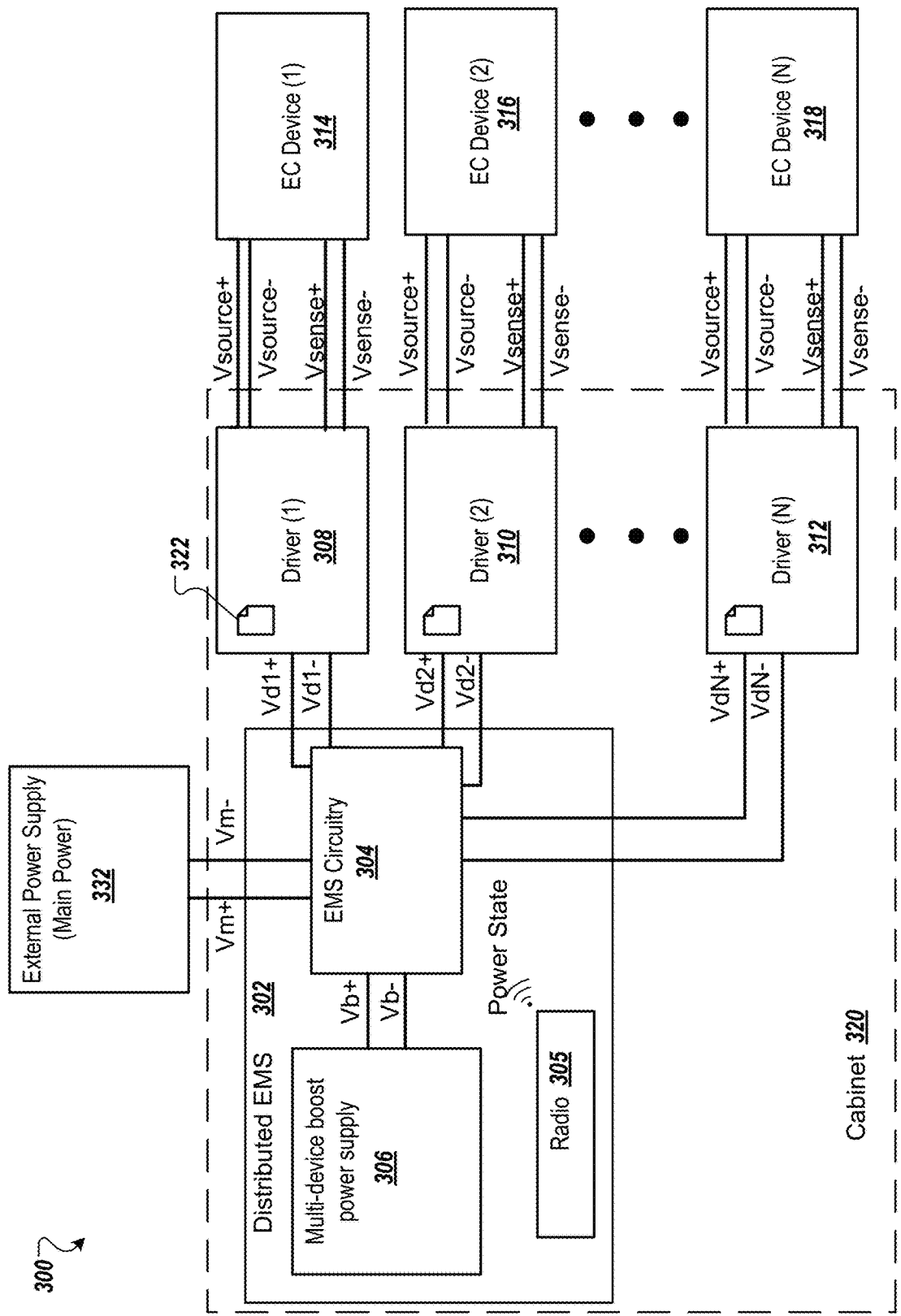
FIG. 3 is a block diagram of a system with a distributed EMS for a set of drivers that are individually coupled to a set of electrochromic devices according to one embodiment.

FIG. 3 is a block diagram of a system 300 with a distributed EMS 302 for a set of drivers 308, 310, 312 that are individually coupled to a set of electrochromic devices 314, 316, 318, respectively, according to one embodiment. The set of drivers includes a first driver 308, a second driver 310, and an Nth driver 312, where N represents a total number of drivers in the set. The first driver 308 is coupled to a first EC device 314, the second driver 310 is coupled to a second EC device 316, and the Nth driver 312 is coupled to an Nth EC device 318.

The distributed EMS 302 can supply a collective power (Vd+/Vd−) to the set of drivers 308, 310, 312. The collective power (Vd) can be made up from external power (Vm+/Vm−), provided by an external power supply 332 (e.g., main power), and additional power (Vb+/Vb−), provided by the multi-device boost power supply 306. The multi-device boost power supply 306 can be the multi-device boost power supply 208 of FIG. 2. The distributed EMS 302 can also broadcast the power state to each of the set of drivers 308, 310, 312. Alternatively, other types of boost power supplies can be used. In one embodiment, the distributed EMS 302 and the set of drivers 308, 310, 312 are located in a cabinet 320. Alternatively, some of the drivers in the set of drivers can be located in one or more other cabinets and one or more additional distributed EMSs can be used to provide additional power to the set of drivers. In another embodiment, a driver for an electrochromic window may be integrated into the window itself in either the frame of the window or in the integrated glass unit (IGU) of the window.

The drivers can supply power individually to the respective EC devices. For example, the first driver supplies a first power (Vsource+/Vsource−) to the first EC device 314. The first driver can also measure a sense voltage (Vsense) of the first EC device 314. The first driver 308 can use the sense voltage and a measured current to control charging and discharging the EC device 314, as described in more detail below. The first driver 308 can receive the power state from the radio 305. Responsive to the power state, the driver can operate according to operating parameters for the respective power state, as specified in a configuration file 322 stored at the first driver 308. Similarly, the second driver 310 and the Nth driver 312 can receive the power state from the radio 305 and operate according to the respective configuration file stored at the respective driver. The operation of an individual driver is described below with respect to FIGS. 4-6. It should also be noted that in other embodiments, a control method can be used where sense wires are not used.

Figure 4:
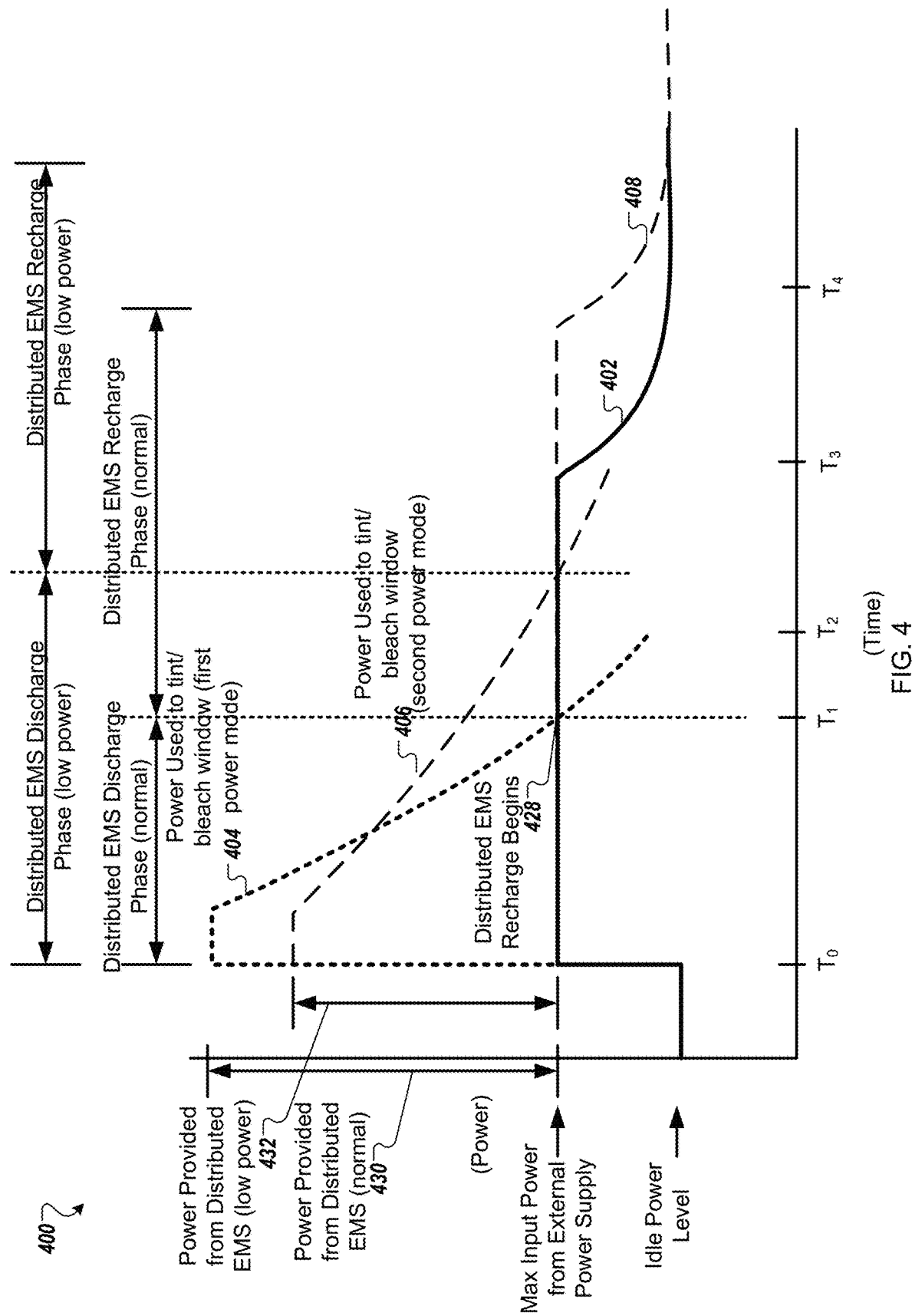
FIG. 4 is a graph 400 illustrating a voltage and current versus time while charging the electrochromic device with the driver of FIG. 3 according to one embodiment.

FIG. 4 is a graph 400 illustrating a voltage and current versus time while charging the electrochromic device with the driver of FIG. 3 according to one embodiment. The y-axis of the graph 400 is power and the x-axis of the graph 400 is time. The solid curve 402 is the power supplied from the external power supply. The dotted curve 404 is the power required to charge (or discharge) the electrochromic device during switching. The dotted curve 404 also represents the power provided by the multi-device boost power supply in a normal power state of the distributed EMS. At times less than a time, to, the electrochromic device is in an idle state, and the power supplied by the external power supply is the idle power level. In some embodiments the idle power level may be zero, for example when the type of EC device used only requires power to switch from one optical transmission state to another optical transmission state. At time $t_0$ the electrochromic device begins switching from one optical transmission state to another optical transmission state (i.e., charging or discharging) and the power required is greater than the maximum input power that can be supplied by the external power supply (i.e., the limited amount of power, or the max input power). Since the power required at time $t_0$ is greater than the limited amount of power (i.e., the max input power), the multi-device boost power supply of the distributed EMS supplies power to the electrochromic device. In some cases, when the power required by the electrochromic device is greater than the limited amount of power that can be supplied from the external power supply, the power can be supplied by both the external power supply and the multi-boost power supply of the distributed EMS. The power required by the electrochromic device between time $t_0$ and time ti reaches a maximum, and then begins to decrease. In some cases, there may be a plateau of high power required by the electrochromic device, and a period requiring decreasing levels of power. At time $t_1$ the power required by the electrochromic device decreases below the limited amount of power that can be delivered by the external power supply, and at that point the power supplied to the electrochromic device can be supplied by the external power supply alone. At time $t_2$, the electrochromic device no longer requires power for switching from one optical transmission state to another optical transmission state, however, in some embodiments some power may still be required from the electrochromic device to maintain the given state of optical transmission.

In some embodiments, the multi-device boost power supply includes a rechargeable battery. After time $t_1$, the amount of power required by the electrochromic device is less than the limited amount of power that can be supplied by the external power supply, and the external power supply can begin to recharge the battery for the multi-device boost power supply. In some cases, at time $t_3$ the battery is close to being fully charged, and the power supplied to recharge the battery for the multi-device boost power supply is reduced. At time $t_4$, the battery is fully charged, and the external power supply can stop providing power to the battery for the multi-device boost power supply. At time $t_4$, the external power supply can return to providing the idle power level if needed.

In some cases, the electrochromic device external power supply recharges the battery of the multi-device boost power supply, and reduces the power supplied to charge the battery when the battery is more than 70% charged, or more than 80% charged or more than 90% charged, or more than 95% charged.

As described herein, in some cases, the distributed EMS can be in different power states and can notify the drivers of the different power states. For example, the driver can be powered by the power provided from the distributed EMS 430 (normal state) as well as the power provided from the external power supply during transition as set forth above. However, when the distributed EMS is in a lower power state, the driver can be powered by the power provided from the distributed EMS 432 (lower power state) as well as the power provided from the external power supply during transition. The driver can accommodate the lower power state by supplying a lower amount of power over a greater period of time to charge or discharge the electrochromic device. The dotted curve 406 is the power provided by the multi-device boost power supply in a lower power state of the distributed EMS. It should be noted that the dotted curve 408 is the power supplied from the external power supply when the distributed EMS is in the lower power state.

When using a distributed EMS, the drivers do not necessarily need a local power supply as done conventionally. A driver (also referred to as electrochromic device driver) for driving electrochromic devices such as electrochromic glass is described below. The driver can charge and discharge an electrochromic device reliably, repeatedly and without exceeding a safe operating realm for the device. In order to do so, the driver can monitor a level of electric charge that is transferred to the electrochromic device, and provides a constant current to the electrochromic device so long as a sense voltage does not exceed a limit. If the sense voltage limit is reached the driver changes to a variable voltage, or a variable current, that is applied to keep the sense voltage at the sense voltage limit. The embodiments described in more detail below protect the electrochromic device from damage. In some cases, voltage and current application cease when the amount of charge transferred to the electrochromic device meets a target amount of charge. In some cases, this is when the electrochromic device is at, or assumed to be at, a target level of optical transmissivity. Various embodiments may have multiple power supplies or a single, more complex power supply, and have analog or digital components for determining charge transfer and controlling the power supply or supplies. In some embodiments, the electrochromic device has an external power supply and a multi-device boost power supply connected to the driver to charge and discharge the electrochromic device.

In most circumstances, the device maintains charge neutrality, and charge is merely moved from one electrode to the other. It follows that the amount of charge transferred to the device is the amount of electrons transferred to the device through one bus bar alone. During switching, electrons are transferred to the device through one bus bar, and an equivalent amount of electrons will be transferred from the device through the other bus bar to maintain charge neutrality. In some cases, the amount of charge transferred to the device will be defined as 0% when all of the transportable charge within the device resides in the anode, and 100% when all of the transportable charge within the devices resides in the cathode. Transportable charge is the amount of charge that can move in the system at a particular device voltage. Certain degradation mechanisms can increase or decrease the total transportable charge in the device (e.g., spurious oxidation), however, this excess charge will be periodically eliminated via the sequestration process (described more completely herein).

Figure 5A:
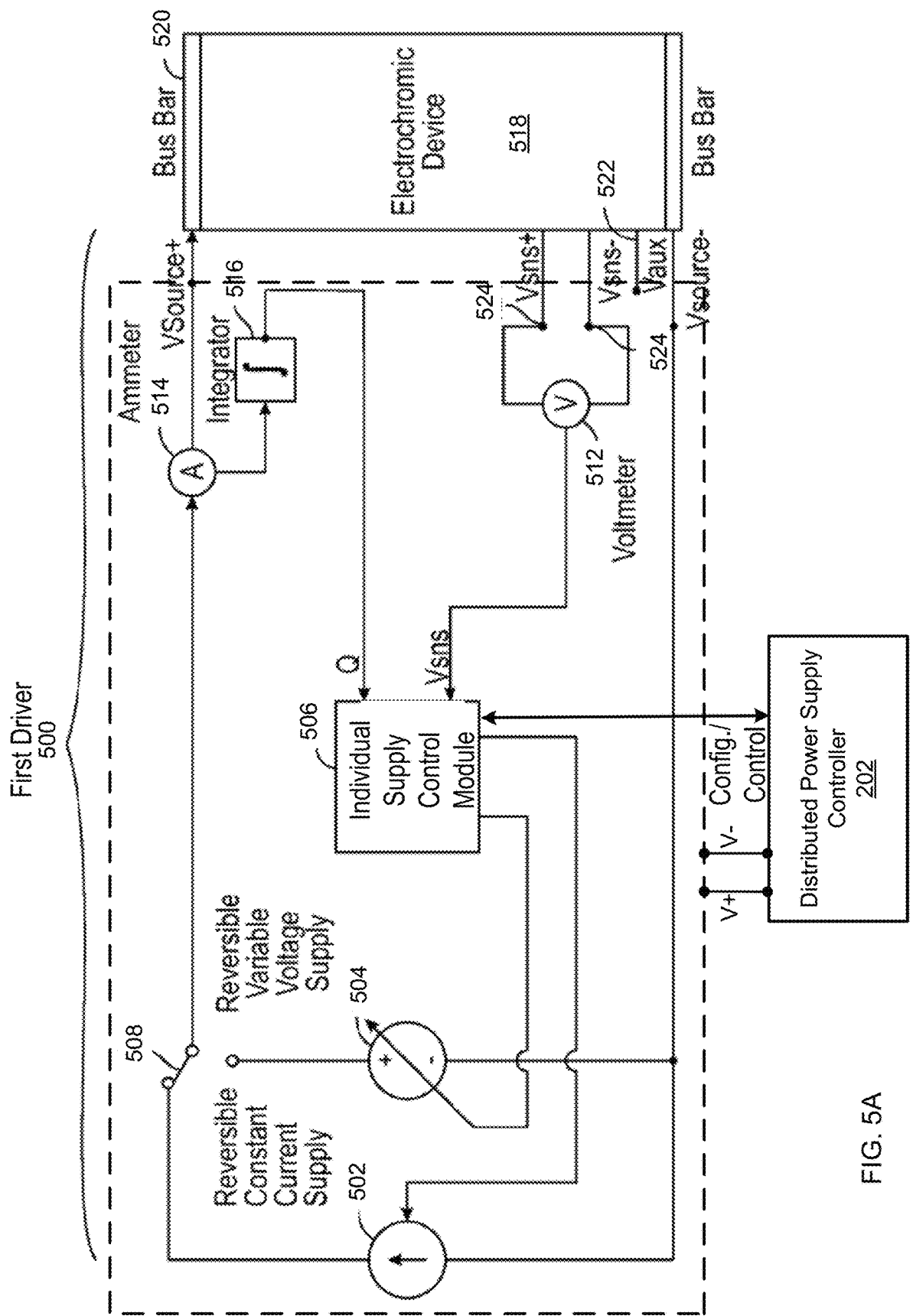
FIG. 5A is a system diagram of a driver and an electrochromic device, in accordance with some embodiments.

FIG. 5A is a system diagram of a driver 500 and an electrochromic device 518, in accordance with some embodiments. The driver 500 applies a constant current from a reversible constant current supply 502 to the electrochromic device 518 during certain phases of operation, and applies a variable voltage from a reversible variable voltage supply 504 to the electrochromic device 518 during further phases of operation. Voltage and current are generally applied to the bus bars 520 of the electrochromic device 518, although in some embodiments of the electrochromic device 518, a charge sequestration terminal "SEQ" (labeled Vaux) 522 is available for further operation, e.g., to sequester charge. In the embodiment shown, one of the bus bars 520 is labeled "VSOURCE+" and another one of the bus bars 520 is labeled "VSOURCE−", so that polarity of the reversible constant current supply 502 and polarity of the reversible variable voltage supply 504 can be determined relative to the bus bar 520 connections. It should be appreciated that the term "reversible" refers to the polarity of the current from the reversible constant current supply 502 as being able to be reversed, so that the reversible constant current supply 502 provides current for either charging or discharging the electrochromic device 518. Similarly, polarity of the voltage from the reversible variable voltage supply 504 can be reversed, so that the reversible variable voltage supply 504 provides a variable amount of voltage (or current) for either charging or discharging the electrochromic device 518. Voltage and current of a first polarity are supplied for charging the electrochromic device 518 towards a first transmissivity, and voltage and current of a second polarity are supplied for discharging the electrochromic device 518 towards a second transmissivity.

In certain cases, the electrochromic device includes, in succession, a first substrate, a first electrically conductive layer, a first electrode, an ion conductor, a second electrode, a second electrically conductive layer, and a second substrate. The two bus bars 520 depicted in FIG. 5A can be electrically connected to the two electrically conductive layers, and therefore one bus bar 520 is associated with one electrode (e.g. the anode) and the other bus bar 520 is associated with the other electrode (e.g. the cathode).

A voltmeter 512 measures a sense voltage, labeled "Vsns", at the sense voltage terminals 524, 526 of the electrochromic device 518. One of the sense voltage terminals 524 is labeled "VSNS+", and another one of the sense voltage terminals 526 is labeled "VSNS−", so that polarity of a measurement of the sense voltage can be determined relative to the sense voltage terminals 524, 526. Other labels are readily devised. In the embodiment shown, the sense voltage terminals 524, 526 are distinct from the bus bars 520, and are located elsewhere than a location of the bus bars 520. A sense voltage terminal 534 could be connected to an interior region of the electrochromic device 518, or various sense voltage terminals 524, 526, 528, 530, 532 could be located along an edge of the electrochromic device 518. Edge locations may be preferable for a gradient type of electrochromic device 518, in which a transmissivity gradient is produced from top to bottom, bottom to top, left to right, right to left or other arrangement. Interior locations may be preferable to detect whether a bull's-eye effect is present. For example, a sense voltage could be taken across an upper region, a middle region, or a lower region of the electrochromic device 518 through suitable terminals, e.g., pairs of sense voltage terminals 524, 526, 528, 530, 532, and 534. Alternatively, a sense voltage could be taken from a sense voltage terminal 524, 526, 528, 530, 532, 534 relative to one of the bus bars 520. In some cases, the two or more sense voltage terminals (e.g., 524 and 526) are electrically connected to the two electrodes of the device (i.e., the anode and cathode).

Sense voltage terminals located at certain spatial locations of the device would provide a measurement of the cell potential (i.e., voltage between the anode and cathode) of the device at a those spatial locations. In some cases, each sense voltage terminal is designed to have a minimal voltage drop between the electrode (i.e. anode or cathode) and the voltmeter 512. The impedance of the sense circuit between the electrodes and the voltmeter 512 can be high, which will make the reading at the voltmeter 512 be close to the actual voltage condition of the electrode location near the sense voltage terminal. In order to measure a specific location within the device, each sense voltage terminal connections to the electrodes (i.e., anode and cathode) can be electrically isolated from the electrically conductive layers. Electrical isolation of each sense terminal can be beneficial because the electrically conductive layers will provide low resistance connections to many locations of the electrodes.

A pair of sense voltage terminals can be connected to the two electrodes (i.e. anode and cathode) in the same or different locations, when viewed from above. In some cases, one sense voltage terminal is at one location on one electrode, and a second sense voltage terminal is located directly above the first on the other electrode. In some cases, one sense voltage terminal is at one location on one electrode, and a second sense voltage terminal is on the other electrode at a different location that has approximately the same cell potential.

In some cases the sense voltage terminals can be directly connected to the bus bars. In other words, one or both of the sense voltage terminals 524 and/or 526 in FIG. 5A could connect to one or both bus bars 520. In some cases, sense voltage terminal 524 is connected to a bus bar 520 associated with one electrode, and the other sense voltage terminal 526 is connected to the other electrode at a location other than a bus bar 520.

In some cases, there are two or more sets of sense voltage terminals, with each set having two sense voltage terminals, where one is electrically connected to one electrode and the other is electrically connected to the other electrode. More than one set allows two independent measurements of the open circuit voltage to be obtained and compared with each other. This is beneficial since in such examples there is a fail-safe, or redundancy, in the system to protect the system from errors or damaged connections associated with one or more sense voltage terminals.

Ammeter 514 measures current supplied to the electrochromic device 518. In the embodiment shown, the ammeter 514 is in line with the VSOURCE+bus bar 520, although in further embodiments the ammeter 514 could be in line with the VSOURCE− bus bar 520.

Still referring to FIG. 5A, integrator 516 receives the output of the ammeter 514, and integrates this over time to produce a value "Q", which is equal to, proportional to, related to, or represents the amount of charge transferred to the electrochromic device 518 over a span of time. The integrator 516 and the ammeter 514 perform a calculation that determines the total amount of charge as equal to or related to the integral of the current into the electrochromic device 518 from a first time to a second time, i.e., over a span of time or a time interval. It should be appreciated that the polarity of the charge, the polarity of the current and the polarity of the voltage are interrelated, and that a negative amount of charge transferred to the electrochromic device 518 is equivalent to a positive amount of charge transferred from the electrochromic device 518, and a positive amount of charge transferred to the electrochromic device 518 is equivalent to a negative amount of charge transferred from the electrochromic device 518, in some embodiments. The phrase "charge transferred to the electrochromic device 518" can be descriptive of both charging and discharging the electrochromic device 518.

Continuing with FIG. 5A, an individual supply control module 506 receives the charge value "Q" from the integrator 516, receives the sense voltage from the voltmeter 512, and controls the reversible constant current supply 502, the reversible variable voltage supply 504, and a switch 508. The switch selects either the reversible constant current supply 502 or the reversible variable voltage supply 504 and couples the selected power supply to the electrochromic device 518. In the embodiment shown, the switch 508 connects the selected power supply to the ammeter, which is in line with one of the bus bars 520. In further embodiments, the switch could connect the selected power supply directly to the bus bar 520. In further embodiments, the reversible constant current supply 502 can be supplied by the external power supply or the multi-device boost power supply or both the external power supply and the multi-device boost power supply, and the reversible variable voltage supply 504 can be supplied by the external power supply or the multi-device boost power supply or both the external power supply and the multi-device boost power supply. The individual supply control module 506 determines, based on the charge value and the sense voltage, whether to apply current or voltage, and the polarity of current or voltage to apply to the electrochromic device 518. Also, the individual supply control module 506 determines a target amount of charge to be transferred to the electrochromic device 518 based on the difference between the present transmissivity, or assumed transmissivity, of the electrochromic device 518 and a target transmissivity of the electrochromic device 518 in some embodiments. These functions can be accomplished with tables, algebraic calculations, and/or various algorithms in various embodiments as readily devised in accordance with some embodiments. One example of a relationship between optical transmission state and transferred charge for an exemplary EC device is T2=T1*10(−CE*deltaQ), where T1 is current transmission state, T2 is target transmission state, CE is coloration efficiency (in the units of (optical density*cm2)/C), and deltaQ is the amount of charge to be transferred to change from state T1 to state T2 (in units of C/cm2). For instance, in an exemplary device with a CE of 50 optical density*cm2/C, to change from a state of 90% transmission to 5% transmission would require roughly 25 mC/cm2 be transferred. Various processes and phases of operation of driver 500 are further described below with reference to FIGS. 2-6.

It should be appreciated that the embodiment illustrated in FIG. 5A of the driver is not meant to be limiting. For example, the reversible constant current supply 502, the reversible variable voltage supply 504 and the switch 508 could be combined in a single, more complex power supply in some embodiments. This power supply is capable of supplying constant current, variable voltage, and reversing polarity in some embodiments. Alternatively, the reversible constant current supply 502 could be implemented as a single polarity constant current supply, with switches for reversing the polarity. The reversible variable voltage supply 504 could be implemented as a single polarity variable voltage supply, with switches for reversing the polarity. The reversible constant current supply 502 can also be a reversible variable current supply in some cases. In variations of these embodiments, the reversible constant current supply 502 can be supplied by different power supplies such as by the external power supply or the multi-device boost power supply or both the external power supply and the multi-device boost power supply, and the reversible variable voltage supply 504 can be supplied by different power supplies such as by the external power supply or the multi-device boost power supply or both the external power supply and the multi-device boost power supply. The switch 508, or other switches in various embodiments of power supplies, could be implemented using relays, solid-state switches, or modes of operation of one or more power supplies. The voltmeter 512 could be implemented using an analog-to-digital converter in some embodiments. The ammeter 514 could be implemented using a low resistance value resistor and an analog-to-digital converter, a Hall effect sensor, an inductive sensor or other sensor, with or without an analog-to-digital converter, or various further devices for detecting current.

The integrator 516 could be an analog integrator, for example based on an operational amplifier with a capacitor in a feedback loop. In some embodiments, the integrator 516 could include a digital adder or arithmetic logic unit, such as found in digital signal processors. In digital embodiments, the integrator 516 could be implemented as a time-series summation of digitally converted values of the current supplied to the electrochromic device. A digital signal processor, or a microprocessor or a controller could be applied to perform such calculations and may be included in the individual supply control module 506. For example, a digital signal processor or a microprocessor with on-chip analog-to-digital conversion could implement the current sensing, the voltage sensing and the integration, as well as the control algorithms applied to the power supply or supplies. In some embodiments, the analog-to-digital converter could be separate from the digital signal processor or the microprocessor. Various further combinations of analog circuitry, digital circuitry, state machines and/or software programming, discrete components, system-on-chip, etc. are readily devised in keeping with the teachings disclosed herein.

The reversible constant current supply 502 and the reversible variable voltage supply 504 can be powered by the collective power from the distributed EMS. That is the distributed EMS can provide power from the external power supply and power from the multi-device boost power supply described above. As described herein, the individual supply control module 506 can receive power state information from the distributed power supply controller 202 via a radio and configuration information and control information from the gateway 106 (not illustrated in FIG. 5A) via the radio. Although not illustrated in FIG. 5A, the distributed power supply controller 202 can provide the power state information to other drivers and the gateway 106 can provide the configuration information and control information to other drivers.

Figure 5B:
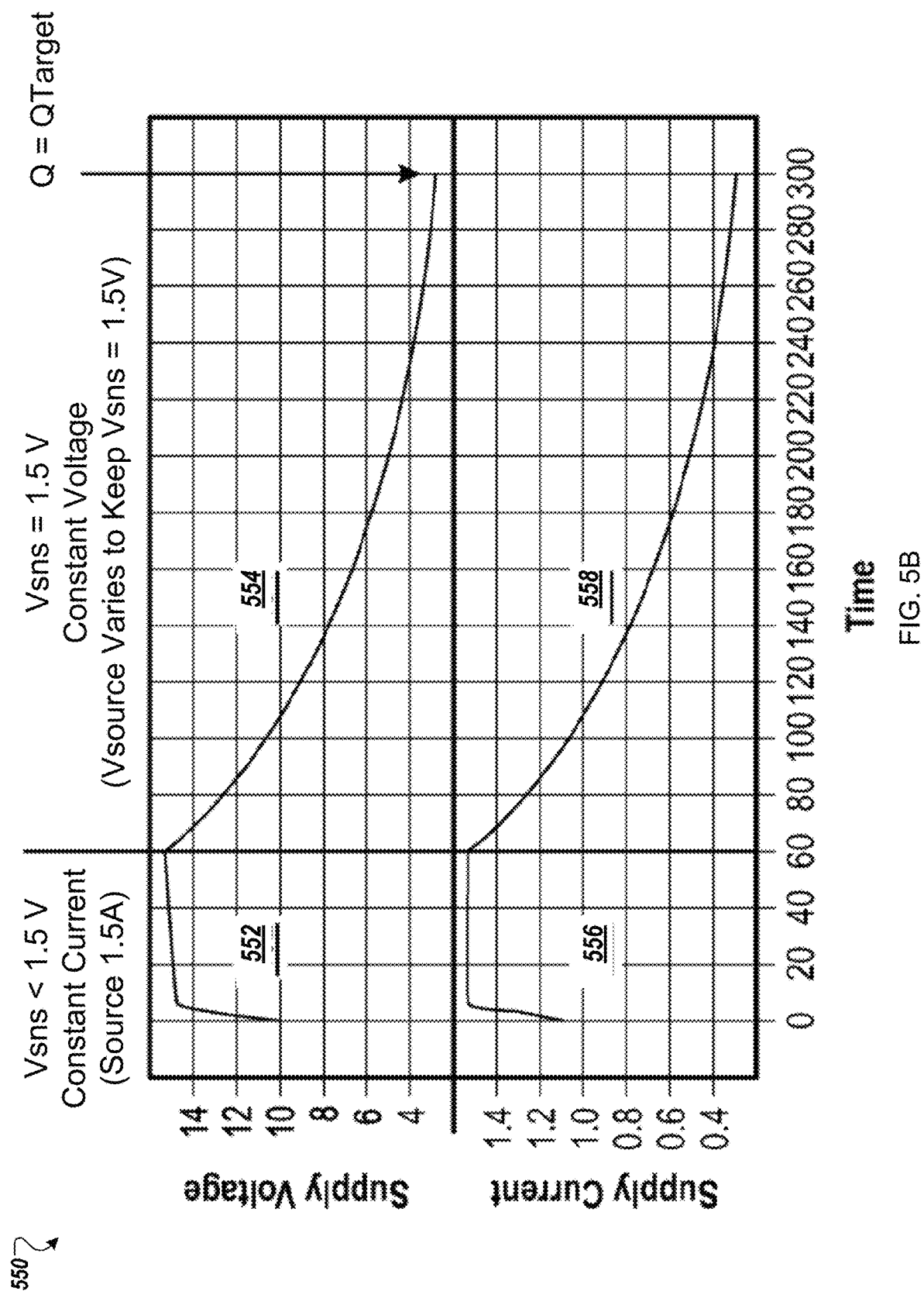
FIG. 5B is a graph illustrating a voltage and current versus time while discharging the electrochromic device with the driver of FIG. 5A according to one embodiment.

FIG. 5B is a graph 550 illustrating a voltage and current versus time while discharging the electrochromic device with the driver of FIG. 5A according to one embodiment. The y-axis of the graph 550 is a voltage (in volts) and a current (in amps) and the x-axis of the graph 550 is time (in seconds). Graph 550 graph depicts charging the electrochromic device with the driver 500 of FIG. 5A in some embodiments. Four regions 552, 554, 556, 558 are shown in the graph. Two of the regions 552, 554 depict supply voltage versus time, and two of the regions 556, 558 depict supply current versus time. The horizontal axis is in seconds of time. The example is for a specific electrochromic device, e.g. a window, and may differ for other electrochromic devices and various dimensions of variations of the electrochromic device. Illustrated in the graph of FIG. 5B, there is an initial, upward spike in both supply voltage and supply current, from time T=zero, for the first few seconds of operation. In the region 556, constant current is applied up until about sixty seconds of time. The voltage rises slightly, from about 14½ V (volts) to about 15 V during this time, as seen in the region 552. In the constant current region 552, 556, the sense voltage is less than a target sense voltage of 1.5 V, and the constant current source provides about 1½ A (amps) to the electrochromic device 518. Alternatively, the target sense voltage can be other voltages, such as 1.7 V.

Continuing with FIG. 5B, at time T=sixty seconds, the sense voltage reaches the target sense voltage of 1.5 V, and the driver 500 switches from constant current to a variable voltage or a variable current to maintain the sense voltage at 1.5 V. In the region 554, the supply voltage is observed to drop from about 15 V down to about 3 V over the next four minutes (e.g., from sixty seconds to three hundred seconds), as the sense voltage is maintained at a constant voltage equal to the target sense voltage. In the region 558, the supply current is observed to drop from about 1.5 A down to about 0.2 A (i.e., about 1½ A down to about ⅕ A), again while maintaining the sense voltage at a constant voltage. It should be noted that the supply current of 1.5 A depends on the geometry of the electrochromic device, for example the length to height ratio of the electrochromic device. The sense voltage can be maintained at the target sense voltage by controlling a variable voltage applied to the bus bars of the electrochromic device in some embodiments. Alternatively, the sense voltage can be maintained at the target sense voltage by controlling a variable current applied to the bus bars of the electrochromic device. At time T=three hundred seconds, the right end of the graph, the charge in the electrochromic device has reached the target charge Qtarget, and the driver 500 stops supplying the variable voltage (or the variable current) to the electrochromic device. In other words, the driver 500 ceases supplying voltage and current to the electrochromic device. The four wire open circuit voltage process and the check state of charge process can then take place. In other cases, the transfer of charge can be stopped after a set time duration elapses.

Figure 5C:
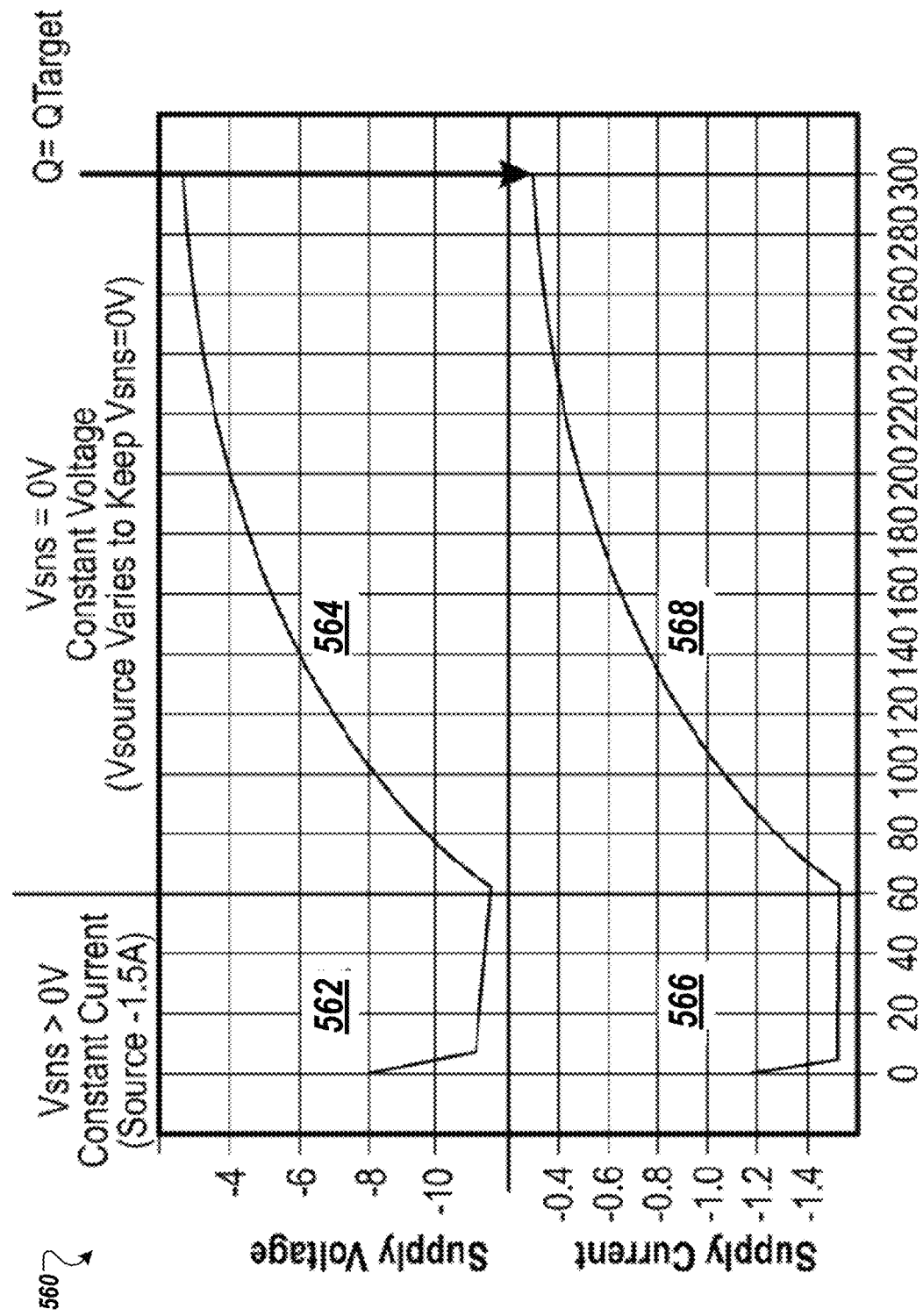
FIG. 5C is a graph showing power supplied to an electrochromic device over time according to one embodiment.

FIG. 5C is a graph 560 showing power supplied to an electrochromic device over time according to one embodiment. The y-axis of the graph 560 is a voltage (in volts) and current (in amps) and the x-axis of the graph 560 is time (in seconds). Graph 560 graph depicts discharging the electrochromic device with the driver 500 of FIG. 5A in some embodiments. The graph of FIG. 5C appears inverted as compared to the graph of FIG. 5B, and the voltages and currents are negative, i.e., opposite polarity as compared to those of FIG. 5B. Otherwise, operation in this mode is similar as described with reference to FIG. 5B. There is an initial, downward (i.e., negative) spike in both supply voltage and supply current, from time T=zero, for the first few seconds of operation. In the region 566, constant current is applied up until about sixty seconds of time. The voltage falls slightly (i.e., magnitude increases slightly in a negative direction), from about −11 V to about −11½ V during this time, as seen in the region 562. In the constant current region 566, 562, the sense voltage is greater than a target sense voltage of 0 V, and the constant current source provides about −1½ A (amps) to the electrochromic device.

At time T=sixty seconds in FIG. 5C, the sense voltage reaches the target sense voltage of 0 V, and the driver 500 switches from constant current to a variable voltage (or a variable current) to maintain the sense voltage at 0 V. In the region 564, the supply voltage is observed to increase from about −11½ V up to about −2½ V (decreasing in magnitude) over the next four minutes (e.g., from sixty seconds to three hundred seconds), as the sense voltage is maintained at a constant voltage equal to the target sense voltage (i.e., 0 V). In the region 568, the supply current is observed to increase from about −1.5 A up to about −0.2 A or −0.3 A (i.e., about −1½ A up to about −¼ A, a decrease in magnitude), again while maintaining the sense voltage at a constant voltage (of 0 V). At time T=three hundred seconds, the right end of the graph, the charge in the electrochromic device has reached the target charge Qtarget, and the driver 500 stops supplying the variable voltage (or the variable current) to the electrochromic device, i.e., the driver 500 stops supplying current or voltage to the electrochromic device. The four wire open circuit voltage process and the check state of charge process can then take place. In other cases, the transfer of charge can be stopped after a set time duration elapses.

The graphs shown in FIGS. 5A and 5B apply to full charge and full discharge of the electrochromic device, respectively. Full charge achieves minimum transmissivity of the electrochromic device, and full discharge achieves maximum transmissivity of the electrochromic device in some embodiments. Partial charge or partial discharge of the electrochromic device achieves various intermediate amounts of transmissivity of the electrochromic device, and may have differing values of target charge and sense voltage, accordingly.

One example of a charge/discharge protocol for the electrochromic device is shown in Table 1 below, similarly to the actions shown in FIGS. 5A and 5B. This protocol can be practiced by the individual supply control module 506 of FIG. 5A.

TABLE 1

Use CCCV (constant current-constant sense voltage) sourcing with 4 W sensing
Full Charge/Partial Charge/Partial Discharge:
Apply constant supply current
Measure sense voltage and supply current (count charge)
Stop step when Qsource = Qtarget
IF
sense voltage reaches Vlimit
THEN
switch to constant voltage mode.
Hold Vsns = Vlimit until Qsource = Qtarget.
Full Discharge:
Apply constant supply current
Measure sense voltage and supply current (count charge)

TABLE 1-continued

IF
sense voltage reaches 0 V
THEN
switch to constant voltage mode.
Hold Vsns = Vlimit until Qsource = Qtarget.

The above protocol applies a non-zero sense voltage limit for full charge, partial charge, and partial discharge, and a 0 V sense voltage limit for full discharge. In the full charge, partial charge and partial discharge, the constant supply current is stopped when the total amount of charge transferred to the electrochromic device reaches the target amount of charge to be in the electrochromic device, or when the sense voltage reaches the sense voltage limit, whichever comes first. If the sense voltage is reached, but the target amount of charge is not yet reached, the constant voltage mode applies a variable voltage to the electrochromic device and holds the sense voltage at the sense voltage limit (i.e., the constant voltage) until the target amount of charge is reached in the electrochromic device. In other cases, the constant current, variable voltage, and/or transfer of charge is stopped after a set time duration elapses. In another example, where the device is set to fully discharge, the sense voltage limit is 0 V, and this is held for a total of five minutes (or some other predetermined time span) while the variable voltage is applied. Constant current (to the electrochromic device) and constant voltage (of the sense voltage) are used, with four wire sensing in some embodiments. That is, there are four wires to the electrochromic device, two of which (attached to the bus bars) are used for supplying current and voltage, and two of which (attached to the sense voltage terminals) are used for the sense voltage. In full charge, partial charge, partial discharge, and full discharge, charge is counted by measuring the supply current (which is integrated over time, or discreetly summed as a digital approximation of an integral over time). The charge count is related to how much charge (i.e., electrons) is transferred to the electrochromic device over time through one of the bus bars, and is applied to the determination of whether the total amount of charge transferred to the electrochromic device has reached a target amount of charge. In other cases, the transfer of charge is stopped after a set time duration elapses. The term "constant current—constant voltage" sourcing, refers to having two stages or phases applied to rapid transmissivity change, namely a first stage of applying constant current to the electrochromic device 518, and a second stage of maintaining constant sense voltage of the electrochromic device 518.

Figure 5D:
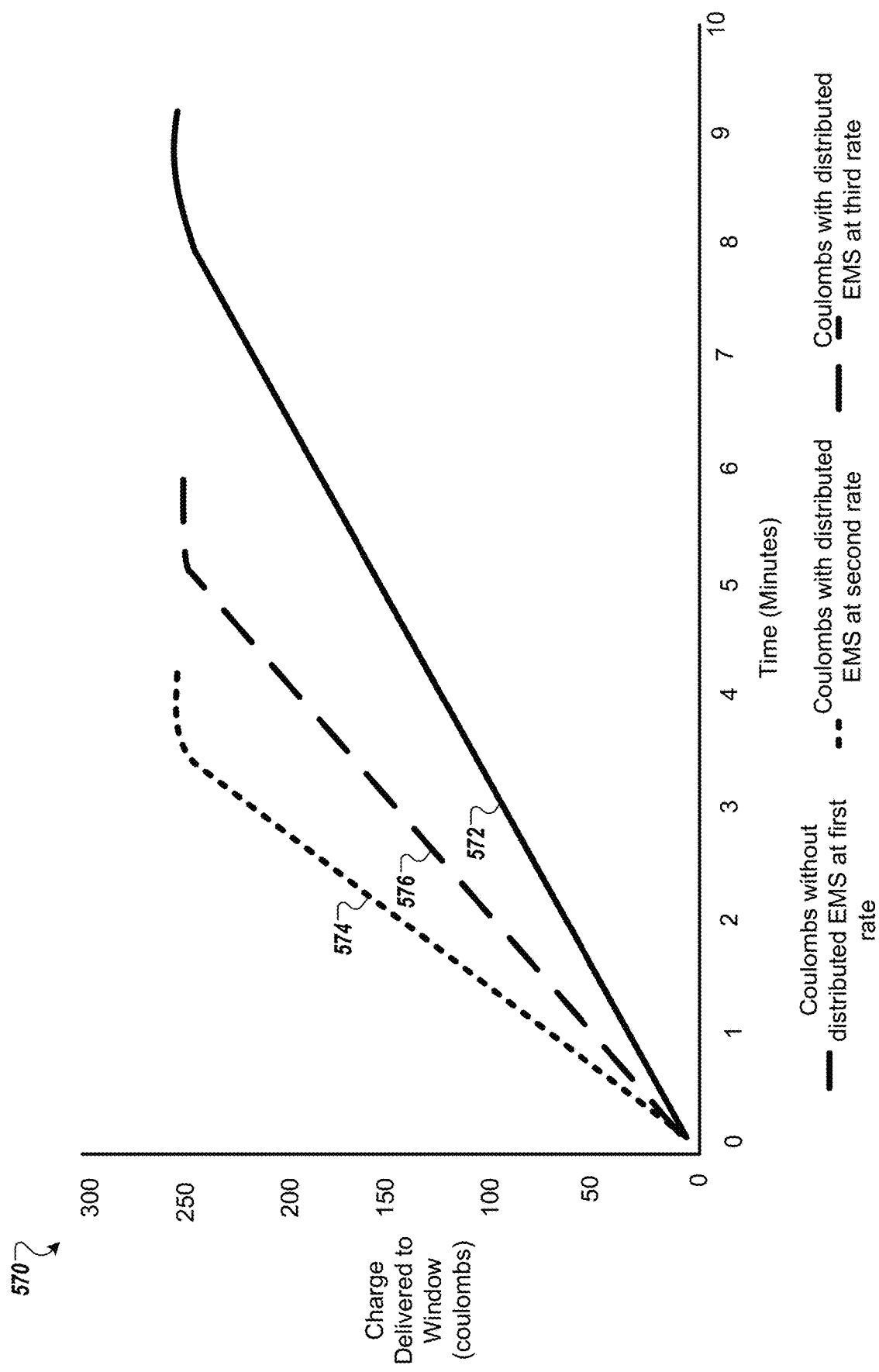
FIG. 5D is a graph illustrating charge delivered without a multi-device boost power supply and with a multi-device boost power supply in two modes according to one embodiment.

FIG. 5D is a graph 570 illustrating charge delivered without a multi-device boost power supply and charge with a multi-device boost power supply in two modes according to one embodiment. The y-axis is charge delivered to the electrochromic device in coulombs and the x-axis is time. The electrochromic device is in this example is an electrochromic window that is approximately rectangular with the dimensions 0.8×1.4 m. This particular device requires approximately 250 C of charge to switch from a first optical transmission state to a second optical transmission state. Alternatively, other sizes of electrochromic windows can be used but would have different charge requirements. The solid curve 572 shows the charge delivered over time to an electrochromic device from an external power supply that is configured to supply a limited amount of power. The maximum amount of power that the external power supply can supply to the window in this example is approximately 500 W. Alternatively, the window takes approximately 8.5 minutes to switch from the initial optical transmission state to the final optical transmission state. A first dashed curve 574 shows the charge delivered over time to an electrochromic device from the same external power supply as above that is configured to supply a limited amount of power, and a multi-device boost power supply while the multi-device boost power supply is in a first power mode (e.g., normal power state). The maximum amount of power that the external power supply can supply to the window again 500 W. However, in this case, the driver for the electrochromic window determines that the window requires more power than the limited amount of power that can be supplied by the external power supply, and the multi-device boost power supply is supplying power to the electrochromic window. The multi-device boost power supply in this example includes a set of lithium iron phosphate batteries with a capacity of 240 Wh, which at 50V is 4800 mAh. In another embodiment, the multi-device boost power supply includes a set of lithium iron phosphate batteries with a capacity of approximately 243 Wh, or 5 Ah or 18 kC with a peak power capacity of approximately 3120 W (e.g., 48.75V*64 A=3120 W (peak)). Alternatively, the total capacity can vary and include more or less total capacity and/or peak power capacity. The window takes approximately 3.5 minutes to switch from the initial optical transmission state to the final optical transmission state.

A second dashed curve 576 shows the charge delivered over time to an electrochromic device from the same external power supply as above that is configured to supply a limited amount of power, and a multi-device boost power supply while the multi-device boost power supply is in a second power mode (e.g., lower power state). The maximum amount of power that the external power supply can supply to the window again 500 W. However, in this case, the driver for the electrochromic window determines that the window requires more power than the limited amount of power that can be supplied by the external power supply, and the multi-device boost power supply is supplying power to the electrochromic window. The multi-device boost power supply in this example includes a set of lithium iron phosphate batteries with a lower capacity than used for the first dashed curve 574. The window takes approximately 5 minutes to switch from the initial optical transmission state to the final optical transmission state. In one embodiment, the multi-device boost power supply (battery pack) of the distributed EMS can supply approximately 2862 W with a peak voltage of 42V. The maximum power it can supply to one window is dependent on the impedance of the panel. For example, a 5'×10' panel has an effective resistance of about 5.25 Ohms, which allows about 8 A when held at a voltage potential of 42V. This results in 336 Watts being supplied to the window. An external power supply can supply power that is dependent on how big of external power supply is provided. For example, the external power supply can supply 500 W, 48 V, and 10 A. The driver can step the voltage down to at least 42V and the panel impedance can limit the current to approximately 8 A at 52 V, so one external 500 W power supply can be as functional as the multi-device boost power supply for a single window of 5'×10' size. The battery capacity can be 240 Wh. At 50V, the battery can provide 4800 mAh. In one embodiment, the boost power supply can have a total capacity of approximately 243 Wh, or 5 Ah or 18 kC with a peak power capacity of approximately 3120 W (e.g., 48.75V*64 A=3120 W (peak)). Alternatively, the total capacity can vary and include more or less total capacity and/or peak power capacity.

This example illustrates some common design limitations often imposed on electrochromic window systems that have effects on the window switching speed. The external power supply is often constrained to be small and therefore only capable of supplying a limited amount of power, due to constraints on system cost and power consumption efficiency. The size and current carrying capacity of the wires connecting the external power supply to the window are also often constrained, due to constraints on system cost and window integration into architectural designs. Both a low power external power supply and low current carrying capacity connecting wires limit the amount of power that can be supplied to the electrochromic window, which limits the switching speed of the device. The multi-device boost power supply that is located local to the electrochromic device solves these problems. A local power supply that is capable of delivering large amounts of power when the window is switching can increase the switching speed of the window. While the window is not switching the external power supply can be supplying small amounts of power to recharge the local power supply. Since the external power supply is sized appropriately to supply low power, the overall energy consumption efficiency of the system increases. The local multi-device boost power supply does add cost to the system, but the added cost is far less than the cost that would be required to achieve the fast switching speed with larger external power supplies and larger wires connecting the external power supplies to the window.

Figure 6:
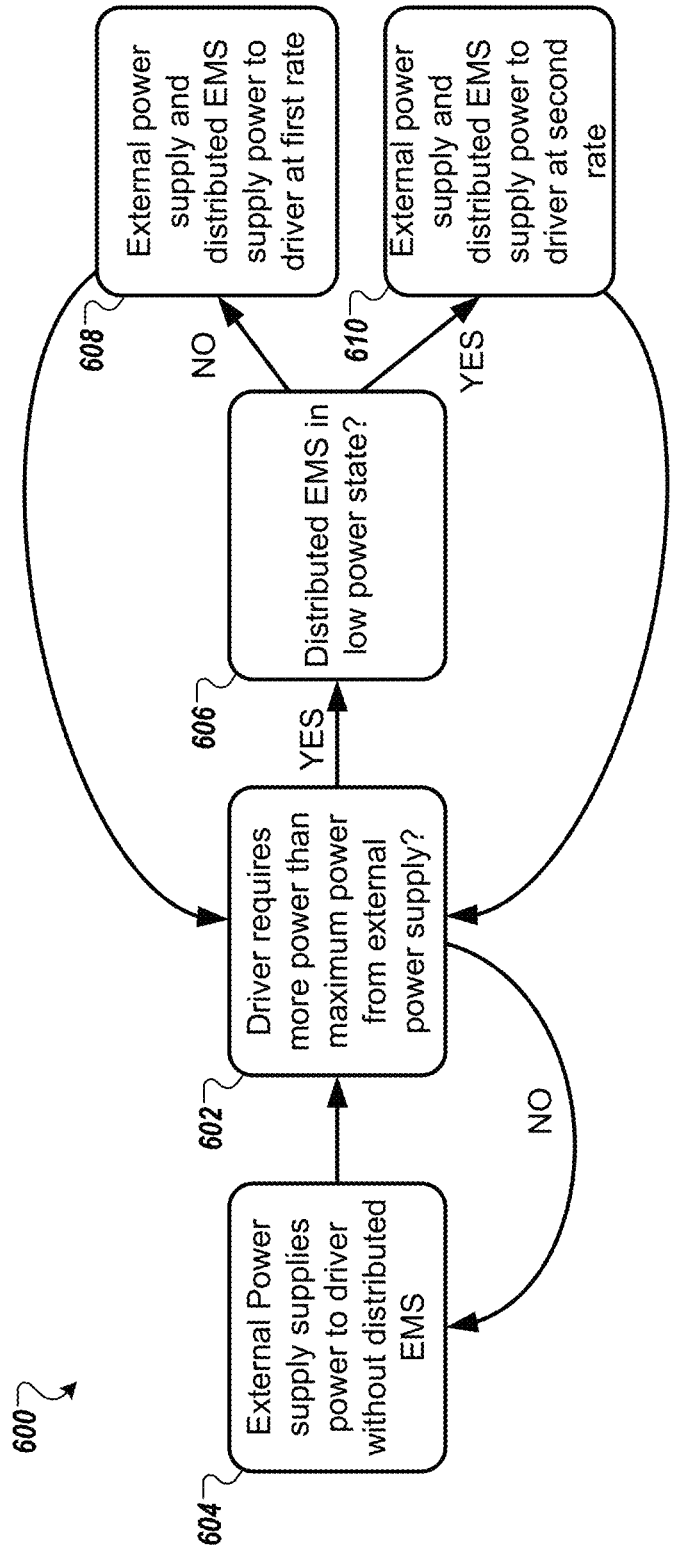
FIG. 6 is a state diagram depicting operations of a set of electrochromic devices with an external power supply and a multi-device boost power supply according to one embodiment.

FIG. 6 is a state diagram 600 depicting operations of an set of electrochromic devices with an external power supply and a multi-device boost power supply according to one embodiment. At state 602, the central question is if the electrochromic device requires more power than the limited amount of power that can be supplied from the external power supply. If the answer is no at state 602, and the power required by the electrochromic device is less than the limited amount of power that can be supplied from the external power supply, then the power can be supplied by the external power supply alone at state 604. That is, the external power supply supplies power to one or more of the drivers without the multi-device boost power supply of the distributed EMS. If the answer is yes at state 602, and the power required by the electrochromic device is more than the limited amount of power that can be supplied from the external power supply, then the power can be supplied by the multi-device boost power supply. In some embodiments, if the answer is yes, and the power required by the electrochromic device is more than the limited amount of power that can be supplied from the external power supply, then the power can be supplied by the external power supply and the multi-device boost power supply together. In the embodiments described herein of the multi-device boost power supply, another question is if the distributed EMS is in a low power state at state 606. If the answer is no at state 606, and the power required by the electrochromic device is more than the limited amount of power that can be supplied from the external power supply and the distributed EMS is not in the lower power state, then the power can be supplied by the multi-device boost power supply at a first charge or discharge rate at state 608. If the answer is yes at state 606, and the power required by the electrochromic device is more than the limited amount of power that can be supplied from the external power supply and the distributed EMS is in the lower power state, then the power can be supplied by the multi-device boost power supply at a second charge or discharge rate at state 610.

The set of electrochromic devices with an external power supply and a multi-device boost power supply can be configured such that the external power supply supplies less than 5% of the maximum power used by the electrochromic device, or less than 10% of the maximum power used by the electrochromic device, or less than 15% of the maximum power used by the electrochromic device, or less than 20% of the maximum power used by the electrochromic device, or less than 25% of the maximum power used by the electrochromic device, or less than 30% of the maximum power used by the electrochromic device, or from 1 to 5% of the maximum power used by the electrochromic device, or from 1 to 10% of the maximum power used by the electrochromic device, or from 1 to 15% of the maximum power used by the electrochromic device, or from 1 to 20% of the maximum power used by the electrochromic device, or from 1 to 25% of the maximum power used by the electrochromic device, or from 1 to 30% of the maximum power used by the electrochromic device.

The set of electrochromic devices with an external power supply and a multi-device boost power supply can have a multi-device boost power supply containing a lithium iron phosphate battery. The set of electrochromic devices with an external power supply and a multi-device boost power supply can have a multi-device boost power supply containing a lithium iron phosphate battery with a capacity from 100 to 10000 mAh, or from 100 to 5000 mAh, or from 100 to 2500 mAh, or from 100 to 1500 mAh, or from 500 to 10000 mAh, or from 1000 to 10000 mAh, or from 1000 to 5000 mAh, or from 1000 to 2500 mAh, or from 1000 to 1500 mAh for each driver corresponding to one of the electrochromic devices.

In some embodiments, the set of electrochromic devices with an external power supply and a multi-device boost power supply with multiple lithium iron phosphate batteries with a capacity capable of fully charging and discharging the set of electrochromic devices more than 1 time, or more than 2 times, or more than 3 times, or more than 4 times, or more than 5 times, or more than 10 times, or from 1 to 10 times, or from 1 to 5 times, or from 2 to 5 times, or from 3 to 5 times.

In some embodiments, the set of electrochromic devices with an external power supply and a multi-device boost power supply with multiple lithium iron phosphate batteries are operated such that the batteries are in shallow discharge operation. In some embodiments, the set of electrochromic devices with an external power supply and a multi-device boost power supply with multiple lithium iron phosphate batteries are operated such that the batteries' charge does not drop below 60% of its full capacity, or below 70% of its full capacity, or below 80% of its full capacity or below 90% of its full capacity. In some embodiments, the set of electrochromic devices with an external power supply and a multi-device boost power supply with multiple lithium iron phosphate batteries are operated such that the batteries' charge does not drop below 60% of its full capacity, or below 70% of its full capacity, or below 80% of its full capacity or below 90% of its full capacity during a typical device charge or discharge cycle. In some embodiments, the set of electrochromic devices with an external power supply and a multi-device boost power supply with multiple lithium iron phosphate batteries are operated such that the batteries' charge does not drop below 60% of its full capacity, or below 70% of its full capacity, or below 80% of its full capacity or below 90% of its full capacity during a charge or discharge cycle that changes the device from a state of maximum optical transmission to a state of minimum optical transmission.

In some embodiments, each of the multiple lithium iron phosphate batteries can have a battery lifetime greater than 5 years, or greater than 10 years, or greater than 15 years, or greater than 20 years, or from 1 to 20 years, or from 1 to 15 years, or from 1 to 10 years, or from 5 to 20 years, or from 5 to 15 years. In some embodiments, each of the multiple lithium iron phosphate batteries can have a battery lifetime greater 1000 cycles, or greater than 2000 cycles, or greater than 3000 cycles, or greater than 5000 cycles, or greater than 10000 cycles, or greater than 20000 cycles, or from 1000 to 20000 cycles, or from 1000 to 10000 cycles.

The set of multiple batteries in the multi-device boost power supply can have any type of rechargeable batteries. More specifically, the each of the multiple batteries can be a lithium iron phosphate battery, a NiCd battery, a Ni-metal hydride battery, a lead acid battery, a Li-ion battery, a Li-ion polymer battery, a Li-ion polymer battery with Co, a Li-ion polymer battery with Mn, a Li-ion polymer battery with a phosphate, a rechargeable alkaline battery, a Li-sulfur battery, a Na-ion battery, a thin film Li battery, a ZnBr battery, a ZnCe battery, a V redox battery, a Na-sulfur battery, a molten salt battery, a AgZn battery. Any of the batteries in the multi-device boost power supply in the previous list can have a capacity from 100 to 10000 mAh, from 100 to 5000 mAh, from 100 to 2500 mAh, from 100 to 1500 mAh, from 500 to 10000 mAh, from 1000 to 10000 mAh, from 1000 to 5000 mAh, from 1000 to 2500 mAh, from 1000 to 1500 mAh.

The multi-device boost power supply can contain any type of electrical energy storage. More specifically, the multi-device boost power supply can contain solid state batteries including a range of electrochemical batteries and capacitors, supercapacitors, or ultracapacitors, or flow batteries including batteries where the energy is stored directly in the electrolyte solution, or Flywheels including mechanical devices that harness rotational energy to deliver instantaneous electricity, or compressed air energy storage, or superconducting magnetic energy storage, or the like.

The multi-device boost power supply can have an external power supply that is located a distance away from the multi-device boost power supply that is more than 1 m, or more than 2 m or more than 5 m, or more than 10 m, or more than 15 m, or more than 20 m, or more than 30 m, or more than 40 m, or more than 50 m, or more than 100 m, or from 1 to 1000 m, or from 1 to 100 m, or from 1 to 50 m, or from 1 to 20 m, or from 10 to 1000 m, or from 10 to 100 m or from 10 to 50 m. The multi-device boost power supply can be located a distance away from the electrochromic device that is more than 1 m, or more than 2 m or more than 5 m, or more than 10 m, or more than 15 m, or more than 20 m, or more than 30 m, or more than 40 m, or more than 50 m, or more than 100 m, or from 1 to 1000 m, or from 1 to 100 m, or from 1 to 50 m, or from 1 to 20 m, or from 10 to 1000 m, or from 10 to 100 m or from 10 to 50 m. The multi-device boost power supply can have an external power supply that is located a distance away from the multi-device boost power supply that is less than 10 m, or less than 5 m, or less than 4 m, or less than 3 m, or less than 2 m, or less than 1 m, or less than 0.1 m, or less than 0.01 m, or from 0.001 to 10 m, or from 0.001 to 5 m, or from 0.001 to 1 m, or from 0.001 to 0.1 m, or from 0.1 to 10 m, or from 0.1 to 5 m, or from 0.1 to 1 m.

The set of electrochromic devices with an external power supply and a multi-device boost power supply can have wires connecting the external power supply to the electrochromic device with AWG gauge greater than 15, or 16, or 17, or 18, or 19, or 20, or 21, or 22, or 23, or 24, or 25, or 26, or 27, or 28, or 29, or 30, or 31, or 32, or 33, or 34, or 35, or 36, or 37, or 38, or 39, or 40, or from 15 to 40, or from 20 to 40, or from 25 to 40, or from 30 to 40, or from 35 to 40, or from or from 15 to 25, or from 15 to 30, or from 20 to 25, or from 20 to 30.

The set of electrochromic devices with an external power supply and a multi-device boost power supply can have an external power supply configured to supply power wirelessly to the electrochromic device. In such a system the external power supply might not have any wires connecting it to the electrochromic device. The set of electrochromic devices with an external power supply and a multi-device boost power supply can have an external power supply configured to supply power wirelessly to the electrochromic device using non-radiative techniques, such as near-field coupling inductive (magnetic) coupling, or near-field resonant inductive coupling, or near-field capacitive coupling, or near-field resonant capacitive coupling, or atmospheric plasma channel coupling, or magnetodynamic coupling, or using far-field radiative techniques such as microwaves or lasers to wireless transmit the power.

The set of electrochromic devices with an external power supply and a multi-device boost power supply can switch from a maximum optical transmissivity to a minimum optical transmissivity state in less than 30 min, or less than 25 minutes, or less than 20 minutes, or less than 15 minutes, or less than 10 minutes, or less than 5 minutes, or from 5 to 30 minutes, or from 5 to 20 minutes, or from 5 to 15 minutes, or from 5 to 10 minutes, or from 1 to 30 minutes, or from 1 to 20 minutes, or from 1 to 10 minutes, or from 1 to 5 minutes. The set of electrochromic devices with an external power supply and a multi-device boost power supply can switch from a first optical transmissivity to a second optical transmissivity state in less than 30 min, or less than 25 minutes, or less than 20 minutes, or less than 15 minutes, or less than 10 minutes, or less than 5 minutes, or from 5 to 30 minutes, or from 5 to 20 minutes, or from 5 to 15 minutes, or from 5 to 10 minutes, or from 1 to 30 minutes, or from 1 to 20 minutes, or from 1 to 10 minutes, or from 1 to 5 minutes.

The multi-device boost power supply can also provide power in situations when the set of electrochromic devices is cut off or disconnected from the external power supply. Such situations could include a power failure of the power provided to the external power supply, or a failure of the external power supply. In some cases, the set of electrochromic devices could be disconnected from the external power supply by a user action. For example, if the electrochromic device is part of an electrochromic window or door assembly, then the assembly may be configured to disconnect the electrochromic device from the external power supply when it is opened. In these situations, the multi-device boost power supply could provide power to the electrochromic device to switch the device from a first transmissivity state to a second transmissivity state or provide power to maintain the electrochromic device in a certain transmissivity state.

Figure 7:
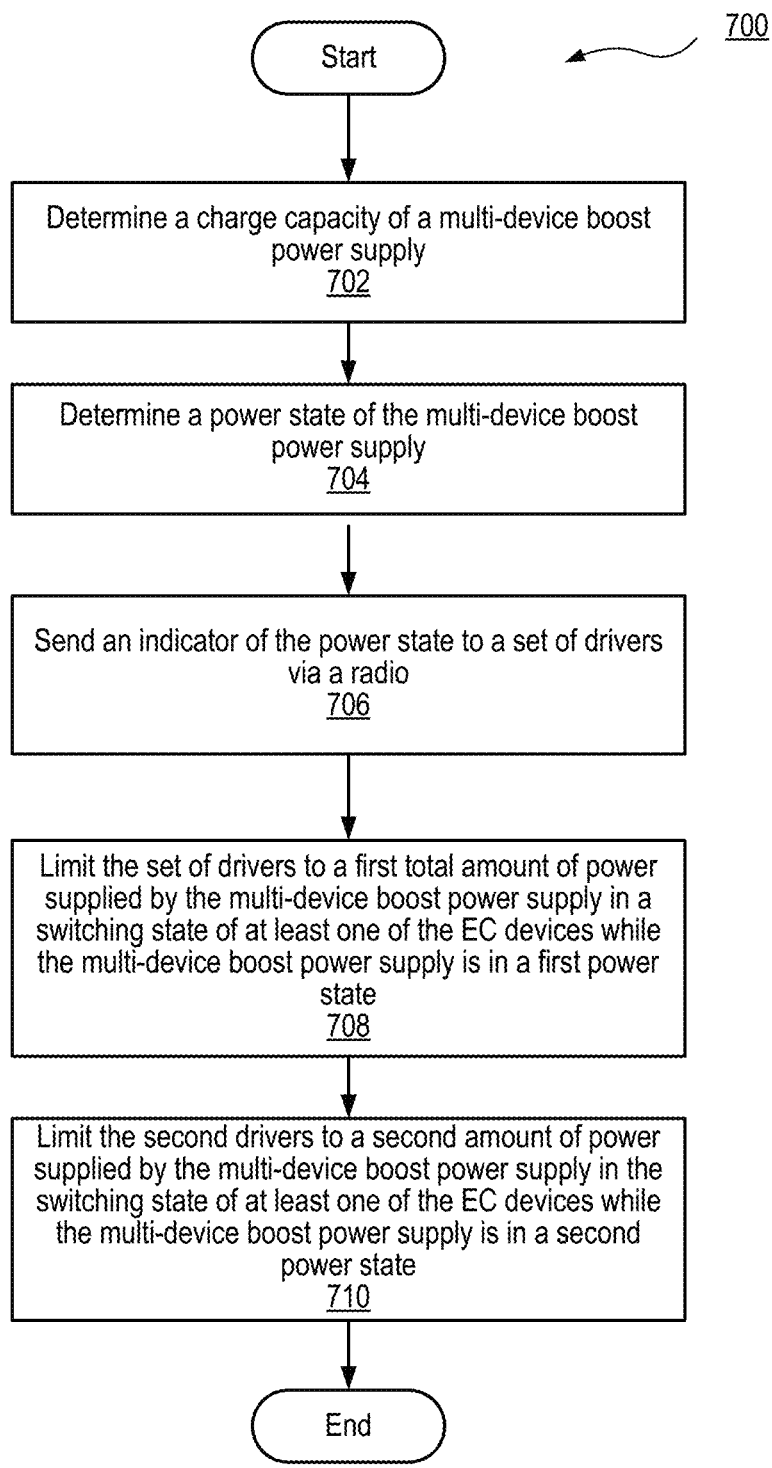
FIG. 7 is a flow diagram of a method of supplying power in two power modes to a set of electrochromic devices according to one embodiment.

FIG. 7 is a flow diagram of a method 700 of supplying power in two power modes to a set of electrochromic devices according to one embodiment. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the distributed EMS 102 of FIG. 1 or FIG. 2 or the distributed EMS 302 of FIG. 3. In another embodiment, the method 700 is performed by the distributed power supply controller 202 of FIG. 2 or FIG. 5 or the distributed EMS 302 of FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 7, the method 700 begins by the processing logic determining a charge capacity of a multi-device boost power supply (block 702). In one embodiment, the processing logic sends configuration data to a set of drivers, the configuration data specifying a first total amount of power that is available in a first power state and a second total amount of power that is available in a second power state. At block 704, the processing logic determines a power state of the multi-device boost power supply using at least the charge capacity. At block 706, the processing logic sends an indicator of the power state to a set of drivers via a radio. The set of drivers charge and discharge a set of electrochromic devices. In some cases, as a result of the power state of the multi-device boost power supply and the state of the set of electrochromic devices, the processing logic supplies a first amount of power to the set of drivers from an external power supply in an idle state of the set of electrochromic devices Alternatively, the processing logic does not supply power to the set of EC windows 130 in the idle state. At block 708, the processing logic supplies a first amount of power to the set of drivers from the multi-device boost power supply in a switching state of at least one of the set of electrochromic devices while the multi-device boost power supply is in a first power state. At block 710, the processing logic supplies a second amount of power to the set of drivers from the multi-device boost power supply in the switching state of at least one of the set of electrochromic devices while the multi-device boost power supply is in a second power state that is a lower power state than the first power state (block 712), and the method 700 ends.

In some cases, all power is supplied by the multi-device boost power supply, which can be constantly recharging from the external power supply. In some cases, if the multi-device boost power supply (e.g., battery pack) is near the end of its charge cycle and is using less power than provided by the external power supply, the power supply's excess capacity could be redirected to provide power to the set of drivers while the multi-device boost power supply finishes its charge. If at any point the load from the drivers exceeds the additional capacity provided by the external power supply, the multi-device boost power supply would provide the additional power to meet the load needed from the drivers.

In a further embodiment, the processing logic detects a power loss event of the external power supply and sends a power loss indicator to the gateway and the set of drivers via the radio, responsive to the power loss event. In another embodiment, the processing logic determines that the charge capacity of the multi-device boost power supply is a first amount. The processing logic determines whether the first amount satisfies a threshold criterion. Responsive to the first amount satisfying the threshold criterion, the processing logic determines that the multi-device boost power supply is in the first power state. Responsive to the first amount not satisfying the threshold criterion, the processing logic determines that the multi-device boost power supply is in the second power state.

As set forth at block 706, the processing logic sends the indicator of the power state. In one embodiment, the processing logic sends the indicator by broadcasting a message via a mesh network protocol. The message includes a bit mask that identifies a group comprising the set of drivers and a gateway operatively coupled to a cloud computing system.

Figure 8:
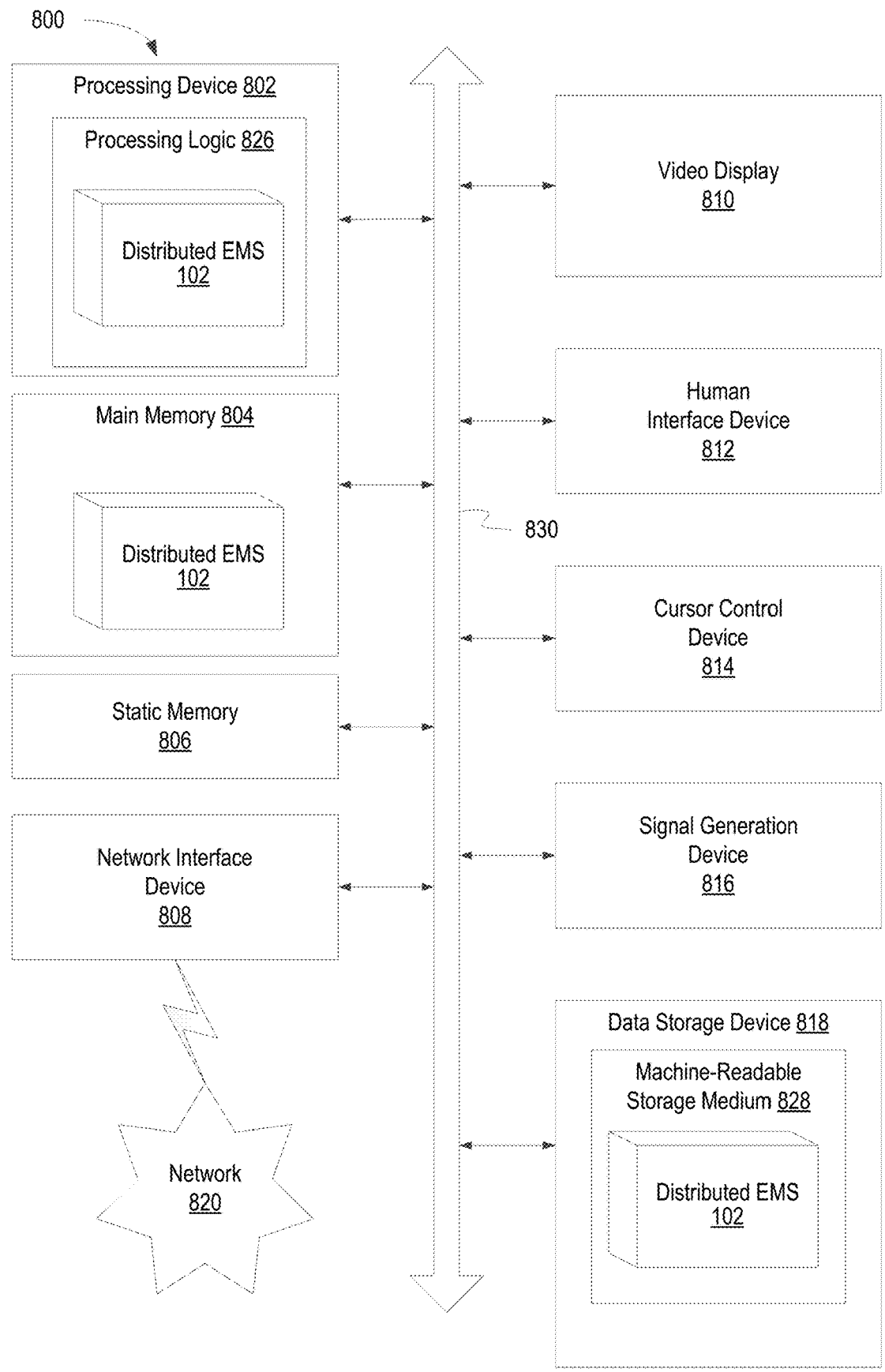
FIG. 8 illustrates a diagrammatic representation of a machine in the example form of a computer system including a set of instructions executable by a computer system to control supply power from an external power supply and a multi-device boost power supply according to any one or more of the methodologies discussed herein.

FIG. 8 illustrates a diagrammatic representation of a machine in the example form of a computer system including a set of instructions executable by a computer system 800 to control supply power from an external power supply and a multi-device boost power supply according to any one or more of the methodologies discussed herein. In one embodiment, the computer system may include instructions to enable execution of the processes and corresponding components shown and described in connection with FIGS. 1-8.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. In various implementations of the present disclosure, the processing device 802 is configured to execute instructions for distributed EMS 102 for performing the operations and processes described herein.

The computer system 800 may further include a network interface device 808. The computer system 800 also may include a video display unit 810 (e.g., a light emitting diode (LED) display, a liquid crystal display (LCD), or a cathode ray tube (CRT)), a human interface device 812 (e.g., keyboard, gesture-control input device, touchpad, touchscreen, a voice-controlled speaker, an alphanumeric input device, or the like), a cursor control device 814 (e.g., a mouse, touchpad, touchscreen, or the like), and a signal generation device 816 (e.g., a speaker).

The data storage device 818 may include a computer-readable storage medium 828 (or machine-readable medium) on which is stored one or more sets of instructions of the distributed EMS 102 embodying any one or more of the methodologies or functions described herein. The instructions may also reside, completely or at least partially, within the main memory 804 and/or within processing logic 826 of the processing device 802 during execution thereof by the computer system 800, the main memory 804 and the processing device 802 also constituting computer-readable media.

The instructions may further be transmitted or received over a network 820 via the network interface device 808. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A distributed energy management system (EMS) comprising:
   an external power supply interface to couple to an external power supply;
   a multi-device boost power supply comprising a set of batteries;
   a driver interface to supply power to a set of drivers that charge and discharge a set of electrochromic devices;
   a communication subsystem to communicate with the set of drivers; and
   EMS circuitry coupled to the external power supply interface, the multi-device boost power supply, the driver interface, and the communication subsystem, wherein the EMS circuitry is to:
send configuration data to the set of drivers, the configuration data specifying a first total amount of power that is available in a first power state and a second total amount of power that is available in a second power state;
determine a charge capacity of the multi-device boost power supply;
determine a power state of the multi-device boost power supply using at least the charge capacity;
send an indicator of the power state to the set of drivers via the communication subsystem, the indicator causing the set of drivers to operate in the first power state or the second power state;
limit the set of drivers to the first total amount of power supplied by the multi-device boost power supply in a switching state of at least one of the set of electrochromic devices while the multi-device boost power supply is in the first power state; and
limit the set of drivers to the second total amount of power supplied by the multi-device boost power supply in the switching state of at least one of the set of electrochromic devices while the multi-device boost power supply is in the second power state that is a lower power state than the first power state, wherein the first total amount of power is greater than the second total amount of power.

2. The distributed EMS of claim 1, wherein the EMS circuitry comprises:
a battery manager device coupled to the external power supply interface and the multi-device boost power supply, wherein the battery manager device is to control charging and discharging the set of batteries; and
a distributed power supply controller coupled to the battery manager device and the communication subsystem, wherein the distributed power supply controller is to:
send a first control signal to the battery manager device to connect the multi-device boost power supply to the driver interface in the switching state while in the first power state; and
send a second control signal to the battery manager device to connect the multi-device boost power supply to the driver interface in the switching state while in the second power state.

3. The distributed EMS of claim 2, further comprising a gateway operatively coupled to a cloud computing system, wherein the distributed power supply controller is further to:
detect a power loss event on the external power supply interface; and
send a power loss indicator to the gateway and the set of drivers via the communication subsystem, responsive to the power loss event.

4. The distributed EMS of claim 2, wherein the distributed power supply controller is further to:
determine that the charge capacity of the multi-device boost power supply is a first amount of charge;
determine whether the first amount of charge satisfies a threshold criterion;
responsive to the first amount satisfying the threshold criterion, determine that the multi-device boost power supply is in the first power state; and
responsive to the first amount of charge not satisfying the threshold criterion, determine that the multi-device boost power supply is in the second power state.

5. The distributed EMS of claim 2, wherein the distributed power supply controller is further to:
determine that the charge capacity of the multi-device boost power supply is a first amount of charge;
determine whether the first amount of charge satisfies a threshold criterion;
responsive to the first amount of charge satisfying the threshold criterion, determine that the multi-device boost power supply is in the second power state; and
responsive to the first amount of charge not satisfying the threshold criterion, determine that the multi-device boost power supply is in the first power state.

6. The distributed EMS of claim 2, wherein the distributed power supply controller is further to:
determine that the charge capacity of the multi-device boost power supply is a first amount of charge; and
determine whether the first amount of charge is in a first range corresponding to the first power state or in a second range corresponding to the second power state.

7. The distributed EMS of claim 2, wherein the distributed power supply controller is further to:
determine that the charge capacity of the multi-device boost power supply is a first amount of charge; and
determine whether the first amount of charge is in a first range corresponding to the first power state, in a second range corresponding to the second power state, or in a third range corresponding to a third power state.

8. The distributed EMS of claim 2, further comprising a gateway operatively coupled to a cloud computing system, wherein the distributed power supply controller is further to send the indicator of the power state to the gateway via the communication subsystem.

9. The distributed EMS of claim 2, further comprising a gateway operatively coupled to a cloud computing system, wherein the communication subsystem comprises a radio, wherein the radio is to wirelessly communicate with the set of drivers and the gateway via a mesh network protocol, wherein the distributed power supply controller is further to send the indicator of the power state by broadcasting a message via the mesh network protocol, wherein the message comprises a bit mask that identifies a group comprising the set of drivers and the gateway.

10. The distributed EMS of claim 2, further comprising a gateway operatively coupled to a cloud computing system, wherein the distributed power supply controller is further to:
store historical usage data regarding the multi-device boost power supply; and
send the historical usage data to the gateway via the communication subsystem.

11. The distributed EMS of claim 2, wherein the distributed power supply controller is further to:
receive a switch control signal from a tint selector via the communication subsystem while in the second power state; and
switch the power state of the multi-device boost power supply from the second power state to the first power state.

12. The distributed EMS of claim 1, wherein the set of batteries comprises lithium iron phosphate batteries, and wherein the set of batteries comprises a capacity of approximately 4800 mAh.

13. The distributed EMS of claim 1, wherein the set of batteries comprise:
a first set of battery cells coupled in series; and
a second set of battery cells coupled in series, wherein the first set of battery cells is coupled in parallel to the second set of battery cells.

14. The distributed EMS of claim 1, wherein the multi-device boost power supply of the distributed EMS is located more than 1 m away from at least one of the set of electrochromic devices.

15. The distributed EMS of claim 1, wherein the external power supply is configured to supply less than 25% of a maximum power used by the set of electrochromic devices during switching of one or more of the set of electrochromic devices.

16. The distributed EMS of claim 1, wherein the set of electrochromic devices comprises an electrochromic window, wherein the electrochromic window comprises a switching time of less than five minutes from a maximum optical transmissivity state to a minimum optical transmissivity state.

17. The distributed EMS of claim 2, wherein the distributed power supply controller is to wirelessly communicate with an individual power supply control module of a first driver of the set of drivers.

18. A method comprising:
sending configuration data to a set of drivers, the configuration data specifying a first total amount of power that is available in a first power state and a second total amount of power that is available in a second power state;
determining a charge capacity of a multi-device boost power supply;
determining a power state of the multi-device boost power supply using at least the charge capacity;
sending an indicator of the power state to the set of drivers via a communication subsystem, the indicator causing the set of drivers to operate in the first power state or the second power state, wherein the set of drivers is configured to charge and discharge a set of electrochromic devices;
limiting the set of drivers to the first total amount of power supplied by an external power supply interface and the multi-device boost power supply in a switching state of at least one of the set of electrochromic devices while the multi-device boost power supply is in the first power state; and
limiting the set of drivers to the second total amount of power supplied by the external power supply interface and the multi-device boost power supply in the switching state of at least one of the set of electrochromic devices while the multi-device boost power supply is in the second power state that is a lower power state than the first power state.

19. The method of claim 18, further comprising:
detecting a power loss event on the external power supply interface; and
sending a power loss indicator to a gateway and the set of drivers via the communication subsystem, responsive to the power loss event.

20. The method of claim 18, further comprising:
determining that the charge capacity is a first amount of charge;
determining whether the first amount of charge satisfies a threshold criterion;
responsive to the first amount of charge satisfying the threshold criterion, determining that the multi-device boost power supply is in the first power state; and
responsive to the first amount of charge not satisfying the threshold criterion, determining that the multi-device boost power supply is in the second power state.

21. The method of claim 18, wherein the sending the indicator comprises broadcasting a message via a mesh network protocol, wherein the message comprises a bit mask that identifies a group comprising the set of drivers and a gateway operatively coupled to a cloud computing system.

22. A system comprising:
a set of electrochromic devices; and
a cabinet comprising:
a set of drivers, wherein each of the set of drivers is to store configuration data, the configuration data specifying a first total amount of power that is available in a first power state and a second total amount of power that is available in a second power state;
an external power supply interface to couple to an external power supply; and
a distributed energy management system (EMS) coupled to the external power supply interface, wherein the distributed EMS comprises a set of batteries, a communication subsystem, and EMS circuitry, wherein the EMS circuitry is to determine a power state of the set of batteries and report the power state via the communication subsystem, and wherein the EMS circuitry is to:
send an indicator of the power state to the set of drivers, the indicator causing the set of drivers to operate in the first power state or the second power state,
limit the set of drivers to the first total amount of power supplied by the external power supply interface and the distributed EMS in a switching state of at least one of the set of electrochromic devices while the distributed EMS is in the first power state; and
limit the set of drivers to the second total amount of power supplied by the external power supply interface and the distributed EMS in the switching state of at least one of the set of electrochromic devices while the distributed EMS is in the second power state that is a lower power state than the first power state.

23. The system of claim 22, further comprising a tint selector wirelessly coupled to the distributed EMS.

* * * * *